US010277604B2

(12) United States Patent
Ross et al.

(10) Patent No.: US 10,277,604 B2
(45) Date of Patent: Apr. 30, 2019

(54) ANALYSIS AND SELECTION OF INTERACTIVE CONTENT RESOURCES FOR EXECUTION

(71) Applicant: Pearson Education, Inc., New York, NY (US)

(72) Inventors: Anthony Brandon Ross, San Antonio, TX (US); Xingyu Pan, San Antonio, TX (US); Stuart Red, San Antonio, TX (US); Subhodip Biswas, Foster City, CA (US)

(73) Assignee: Pearson Education, Inc., Bloomington, MN (US)

( * ) Notice: Subject to any disclaimer, the term of this patent is extended or adjusted under 35 U.S.C. 154(b) by 140 days.

(21) Appl. No.: 15/474,796

(22) Filed: Mar. 30, 2017

(65) Prior Publication Data

US 2018/0288064 A1   Oct. 4, 2018

(51) Int. Cl.
| | | |
|---|---|---|
| *G06F 7/04* | (2006.01) | |
| *G06F 15/16* | (2006.01) | |
| *G06F 17/30* | (2006.01) | |
| *H04L 29/06* | (2006.01) | |
| *H04L 12/911* | (2013.01) | |
| *H04L 29/08* | (2006.01) | |
| *H04N 21/00* | (2011.01) | |

(52) U.S. Cl.
CPC ...... *H04L 63/105* (2013.01); *G06F 17/30867* (2013.01); *H04L 47/70* (2013.01); *H04L 63/08* (2013.01); *H04L 63/107* (2013.01); *H04L 67/18* (2013.01); *H04N 21/00* (2013.01)

(58) Field of Classification Search
USPC .......................................................... 726/4
See application file for complete search history.

(56) References Cited

U.S. PATENT DOCUMENTS

| | | | | |
|---|---|---|---|---|
| 2013/0031208 A1* | 1/2013 | Linton | ................... | G09B 7/02 709/217 |
| 2016/0316268 A1* | 10/2016 | Carmichael | ........ | H04N 21/4662 |

* cited by examiner

*Primary Examiner* — Jeffrey C Pwu
*Assistant Examiner* — Samuel Ambaye
(74) *Attorney, Agent, or Firm* — Quarles and Brady LLP

(57) ABSTRACT

Techniques described herein relate to analyzing executions of content resources within networks of execution client devices, and selecting sets of interactive content resources for execution on particular execution devices based on such analyses. Content resource execution data may be received from various execution client devices on which content resources have been executed and provided to end users. Such data may be analyzed to determine correlations between a first content executor and additional content executors based on the their respective content resource execution data, and the content resource execution data of correlated content executors may be aggregated and analyzed to select particular interactive content resources for the first content executor. Such selections may be provided to first content executor during a content execution session following an authenticated login by the first content executor.

17 Claims, 13 Drawing Sheets

Favorite batteries | Expand all

Other clinicians like you have used the following assessment battery (U052701):

| | | | | Duration |
|---|---|---|---|---|
| | | | | 39 min |
| | 1 | PPVT-4 Form A | Language | 13 min |
| | 2 | WISC-V Information | Verbal Comprehension | 5 min |
| | 3 | WISC-V Picture Concepts | Fluid Reasoning | 7 min |
| | 4 | WISC-V Cancellation | Processing Speed | 3 min |
| | 5 | WISC-V Comprehension | Verbal Comprehension | 11 min |

Edit
Delete

1 Recommended Battery

Other clinicians like you have used the following assessment battery (U052701):

FIG. 13

ANALYSIS AND SELECTION OF INTERACTIVE CONTENT RESOURCES FOR EXECUTION

BACKGROUND

Content providers can provide vast and diverse content resources to users live, live-streamed, and on-demand. In some cases, content distribution networks and systems may generate and provide various interactive content resources to user devices using various delivery techniques. Such content resources may include, for example, audio and video media content, gaming software, professional training and educational content resources, clinical assessments administered by educators or medical personnel to students or patients, and the like. In some cases, the client devices executing and providing the content resources to users may receive and analyze responses and other feedback data associated with the execution of the content resources, and may return such feedback data to the content provider. For example, the content provider may receive feedback from a user device on the content or the quality of the content delivery. Additional feedback may correspond to the execution status of resource(s) on the user device, while other feedback may relate to interactive user responses provided during or after execution of the resources.

BRIEF SUMMARY

Various techniques are described herein for analyzing the execution of content resources within networks of execution client devices, and selecting sets of interactive content resources for execution on particular execution devices based on such analyses. In some embodiments, content resource execution data may be received from various execution client devices on which content resources have been executed and provided to end users. Such interactive content resources may include, for example, audio and video media resources, gaming software resources, professional training and educational resources, clinical assessment resources, and the like. The data corresponding to the execution of various content resources on various execution client devices may be received and stored in one or more data structures storing associations between particular content resources and particular content executors and/or end users. The data structures may be analyzed to determine correlations between a first content executor and one or more additional content executors based on the their respective content resource execution data. After determining such correlations, the content resource execution data may be aggregated for the additional content executors, and compared to the content resource execution data for the first content executor. Particular interactive content resources may be selected for the first content executor, and the selections may be provided to first content executor during a content execution session following an authenticated login by the first content executor.

Additional techniques described herein relate to determining correlations between particular content executors based on content resource execution data stored in an association matrix. In some embodiments, a singular vector decomposition may be applied to a matrix data structure storing associations between content executors and interactive content resources. Key features may be extracted from the matrix based on the singular vector decomposition, and used to calculate a similarity index value for each additional content executor with respect the first content executor. In certain cases, the collection of data to be aggregated may correspond to a predetermined number of additional content executors having the highest similarity index values with respect to the first content executor. In other cases, the aggregated data may correspond to data from any of the additional content executors having a similarity index value greater than a predetermined similarity threshold. Further techniques described herein relate to selecting the particular interactive content resources for the first content executor based on feedback data corresponding to a performance level of an end user during the execution of an interactive content resource. In some embodiments, such feedback data from end users and/or content executors may be received and stored along with the content resource execution data, so that determined correlations between the first content executor and additional content executors may be based on the performance levels of end users during the executions of interactive content resources initiated by the content executors.

Further techniques and areas of applicability of the present disclosure will become apparent from the detailed description provided hereinafter. It should be understood that the detailed description and specific examples, while indicating various embodiments, are intended for purposes of illustration only and are not intended to necessarily limit the scope of the disclosure.

BRIEF DESCRIPTION OF THE DRAWINGS

FIG. 13 is an example user interface display screen outputting a selected battery of assessment resources for a particular content executor, according to one or more embodiments of the disclosure.

Figure 1:
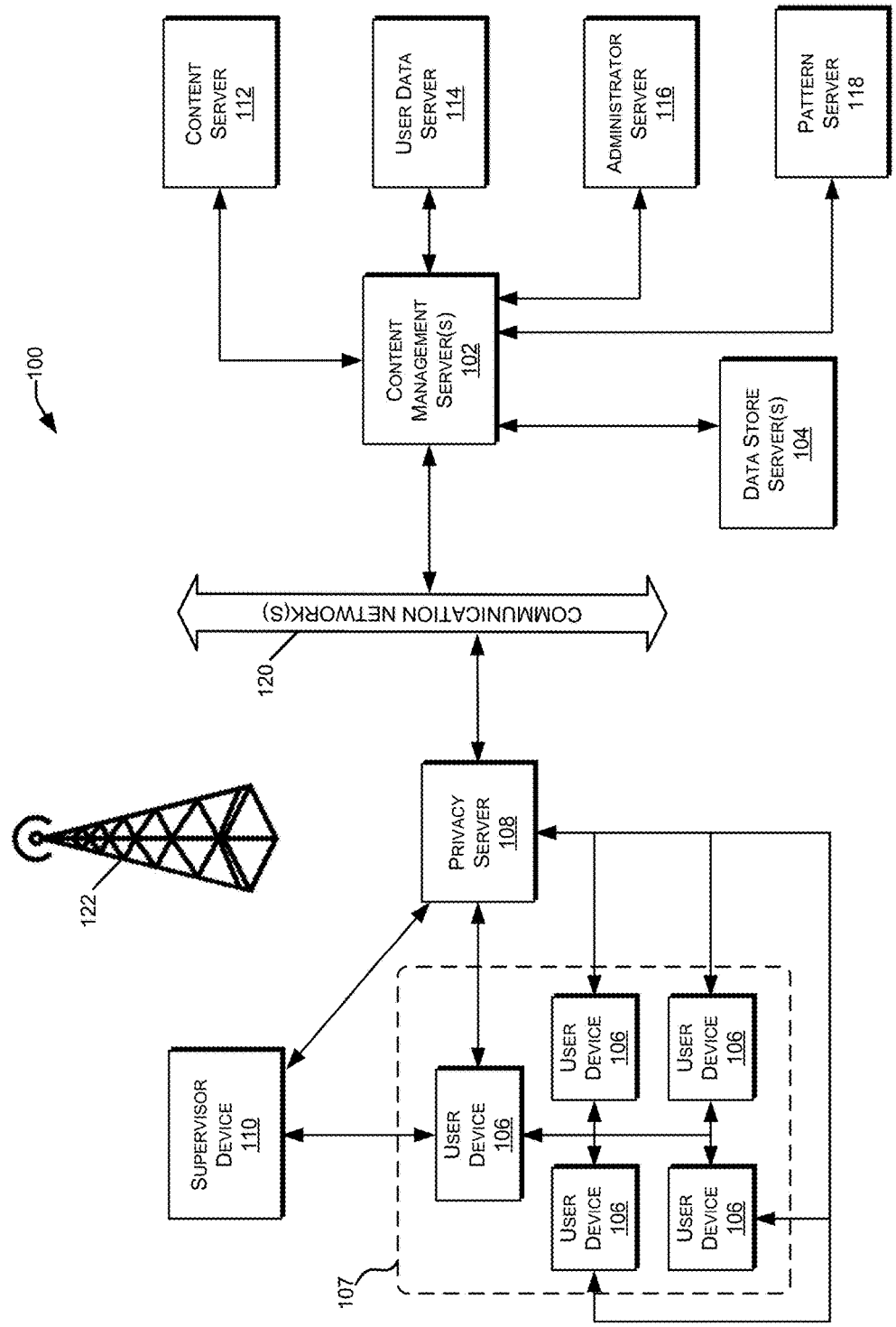
FIG. 1 is a block diagram illustrating an example of a content distribution network.

In the appended figures, similar components and/or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

The ensuing description provides illustrative embodiment(s) only and is not intended to limit the scope, applicability or configuration of the disclosure. Rather, the ensuing description of the illustrative embodiment(s) will provide those skilled in the art with an enabling description for implementing a preferred exemplary embodiment. It is understood that various changes can be made in the function and arrangement of elements without departing from the spirit and scope as set forth in the appended claims.

In the present invention, a content distribution network delivers content that can include training, entertainment, assessment, and evaluation among many other types of content. Content can be delivered on-demand to devices operated by users in remote or local locations or can be delivered live in a present local or live-streamed to remote locations. In some cases, client execution devices and/or users receiving the content may provide feedback relating to the execution of the content. In this context, various techniques (e.g., systems, methods, computer-program products tangibly embodied in a non-transitory machine-readable storage medium, etc.) are described herein relating to analyzing the execution of content resources within execution client devices, and selecting sets of interactive content resources for execution on particular execution devices based on such analyses. In some embodiments, content resource execution data may be received from various execution client devices on which content resources have been executed and provided to end users. Such interactive content resources may include, for example, audio and video media resources, gaming software resources, professional training and educational resources, clinical assessment resources, and the like. The data corresponding to the execution of various content resources on various execution client devices may be received and stored in one or more data structures storing associations between particular content resources and particular content executors and/or end users. The data structures may be analyzed to determine correlations between a first content executor and one or more additional content executors based on the their respective content resource execution data. After determining such correlations, the content resource execution data may be aggregated for the additional content executors, and compared to the content resource execution data for the first content executor. Particular interactive content resources may be selected for the first content executor, and the selections may be provided to first content executor during a content execution session following an authenticated login by the first content executor.

Additional techniques described herein relate to determining correlations between particular content executors based on content resource execution data stored in an association matrix. In some embodiments, a singular vector decomposition may be applied to a matrix data structure storing associations between content executors and interactive content resources. Key features may be extracted from the matrix based on the singular vector decomposition, and used to calculate a similarity index value for each additional content executor with respect the first content executor. In certain cases, the collection of data to be aggregated may correspond to a predetermined number of additional content executors having the highest similarity index values with respect to the first content executor. In other cases, the aggregated data may correspond to data from any of the additional content executors having a similarity index value greater than a predetermined similarity threshold. Further techniques described herein relate to selecting the particular interactive content resources for the first content executor based on feedback data corresponding to a performance level of an end user during the execution of an interactive content resource. In some embodiments, such feedback data from end users and/or content executors may be received and stored along with the content resource execution data, so that determined correlations between the first content executor and additional content executors may be based on the performance levels of end users during the executions of interactive content resources initiated by the content executors.

With reference now to FIG. 1, a block diagram is shown illustrating various components of a content distribution network (CDN) 100 which implements and supports certain embodiments and features described herein. In some embodiments, the content distribution network 100 can comprise one or several physical components and/or one or several virtual components such as, for example, one or several cloud computing components. In some embodiments, the content distribution network 100 can comprise a mixture of physical and cloud computing components.

Content distribution network 100 may include one or more content management servers 102. As discussed below in more detail, content management servers 102 may be any desired type of server including, for example, a rack server, a tower server, a miniature server, a blade server, a mini rack server, a mobile server, an ultra-dense server, a super server, or the like, and may include various hardware components, for example, a motherboard, a processing units, memory systems, hard drives, network interfaces, power supplies, etc. Content management server 102 may include one or more server farms, clusters, or any other appropriate arrangement and/or combination or computer servers. Content management server 102 may act according to stored instructions located in a memory subsystem of the server 102, and may run an operating system, including any commercially available server operating system and/or any other operating systems discussed herein.

The content distribution network 100 may include one or more data store servers 104, such as database servers and file-based storage systems. The database servers 104 can access data that can be stored on a variety of hardware components. These hardware components can include, for example, components forming tier 0 storage, components forming tier 1 storage, components forming tier 2 storage, and/or any other tier of storage. In some embodiments, tier 0 storage refers to storage that is the fastest tier of storage in the database server 104, and particularly, the tier 0 storage is the fastest storage that is not RAM or cache memory. In some embodiments, the tier 0 memory can be embodied in solid state memory such as, for example, a solid-state drive (SSD) and/or flash memory.

In some embodiments, the tier 1 storage refers to storage that is one or several higher performing systems in the memory management system, and that is relatively slower than tier 0 memory, and relatively faster than other tiers of memory. The tier 1 memory can be one or several hard disks that can be, for example, high-performance hard disks. These hard disks can be one or both of physically or communicatively connected such as, for example, by one or several fiber channels. In some embodiments, the one or several disks can be arranged into a disk storage system, and specifically can be arranged into an enterprise class disk storage system. The disk storage system can include any desired level of redundancy to protect data stored therein, and in one embodiment, the disk storage system can be made with grid architecture that creates parallelism for uniform allocation of system resources and balanced data distribution.

In some embodiments, the tier 2 storage refers to storage that includes one or several relatively lower performing systems in the memory management system, as compared to the tier 1 and tier 2 storages. Thus, tier 2 memory is relatively slower than tier 1 and tier 0 memories. Tier 2 memory can include one or several SATA-drives or one or several NL-SATA drives.

In some embodiments, the one or several hardware and/or software components of the database server 104 can be arranged into one or several storage area networks (SAN), which one or several storage area networks can be one or several dedicated networks that provide access to data storage, and particularly that provides access to consolidated, block level data storage. A SAN typically has its own network of storage devices that are generally not accessible through the local area network (LAN) by other devices. The SAN allows access to these devices in a manner such that these devices appear to be locally attached to the user device.

Data stores 104 may comprise stored data relevant to the functions of the content distribution network 100. Illustrative examples of data stores 104 that may be maintained in certain embodiments of the content distribution network 100 are described below in reference to FIG. 3. In some embodiments, multiple data stores may reside on a single server 104, either using the same storage components of server 104 or using different physical storage components to assure data security and integrity between data stores. In other embodiments, each data store may have a separate dedicated data store server 104.

Content distribution network 100 also may include one or more user devices 106 and/or supervisor devices 110. User devices 106 and supervisor devices 110 may display content received via the content distribution network 100, and may support various types of user interactions with the content. User devices 106 and supervisor devices 110 may include mobile devices such as smartphones, tablet computers, personal digital assistants, and wearable computing devices. Such mobile devices may run a variety of mobile operating systems, and may be enabled for Internet, e-mail, short message service (SMS), Bluetooth®, mobile radio-frequency identification (M-RFID), and/or other communication protocols. Other user devices 106 and supervisor devices 110 may be general purpose personal computers or special-purpose computing devices including, by way of example, personal computers, laptop computers, workstation computers, projection devices, and interactive room display systems. Additionally, user devices 106 and supervisor devices 110 may be any other electronic devices, such as a thin-client computers, an Internet-enabled gaming systems, business or home appliances, and/or a personal messaging devices, capable of communicating over network(s) 120.

In different contexts of content distribution networks 100, user devices 106 and supervisor devices 110 may correspond to different types of specialized devices, for example, student devices and teacher devices in an educational network, employee devices and presentation devices in a company network, different gaming devices in a gaming network, etc. In some embodiments, user devices 106 and supervisor devices 110 may operate in the same physical location 107, such as a classroom or conference room. In such cases, the devices may contain components that support direct communications with other nearby devices, such as a wireless transceivers and wireless communications interfaces, Ethernet sockets or other Local Area Network (LAN) interfaces, etc. In other implementations, the user devices 106 and supervisor devices 110 need not be used at the same location 107, but may be used in remote geographic locations in which each user device 106 and supervisor device 110 may use security features and/or specialized hardware (e.g., hardware-accelerated SSL and HTTPS, WS-Security, firewalls, etc.) to communicate with the content management server 102 and/or other remotely located user devices 106. Additionally, different user devices 106 and supervisor devices 110 may be assigned different designated roles, such as presenter devices, teacher devices, administrator devices, or the like, and in such cases the different devices may be provided with additional hardware and/or software components to provide content and support user capabilities not available to the other devices.

The content distribution network 100 also may include a privacy server 108 that maintains private user information at the privacy server 108 while using applications or services hosted on other servers. For example, the privacy server 108 may be used to maintain private data of a user within one jurisdiction even though the user is accessing an application hosted on a server (e.g., the content management server 102) located outside the jurisdiction. In such cases, the privacy server 108 may intercept communications between a user device 106 or supervisor device 110 and other devices that include private user information. The privacy server 108 may create a token or identifier that does not disclose the private information and may use the token or identifier when communicating with the other servers and systems, instead of using the user's private information.

As illustrated in FIG. 1, the content management server 102 may be in communication with one or more additional servers, such as a content server 112, a user data server 112, and/or an administrator server 116. Each of these servers may include some or all of the same physical and logical components as the content management server(s) 102, and in some cases, the hardware and software components of these servers 112-116 may be incorporated into the content management server(s) 102, rather than being implemented as separate computer servers.

Content server 112 may include hardware and software components to generate, store, and maintain the content resources for distribution to user devices 106 and other devices in the network 100. For example, in content distribution networks 100 used for professional training and educational purposes, content server 112 may include data stores of training materials, presentations, plans, syllabi, reviews, evaluations, interactive programs and simulations, course models, course outlines, and various training interfaces that correspond to different materials and/or different types of user devices 106. In content distribution networks 100 used for media distribution, interactive gaming, and the like, a content server 112 may include media content files such as music, movies, television programming, games, and advertisements.

User data server 114 may include hardware and software components that store and process data for multiple users relating to each user's activities and usage of the content distribution network 100. For example, the content management server 102 may record and track each user's system usage, including their user device 106, content resources accessed, and interactions with other user devices 106. This data may be stored and processed by the user data server 114, to support user tracking and analysis features. For instance, in the professional training and educational contexts, the user data server 114 may store and analyze each user's training materials viewed, presentations attended, courses completed, interactions, evaluation results, and the like. The user data server 114 may also include a repository for user-generated material, such as evaluations and tests completed by users, and documents and assignments prepared by users. In the context of media distribution and interactive gaming, the user data server 114 may store and process resource access data for multiple users (e.g., content titles accessed, access times, data usage amounts, gaming histories, user devices and device types, etc.). The user data server 114 may also store user patterns associated with facial expressions made during content delivery.

Administrator server 116 may include hardware and software components to initiate various administrative functions at the content management server 102 and other components within the content distribution network 100. For example, the administrator server 116 may monitor device status and performance for the various servers, data stores, and/or user devices 106 in the content distribution network 100. When necessary, the administrator server 116 may add or remove devices from the network 100, and perform device maintenance such as providing software updates to the devices in the network 100. Various administrative tools on the administrator server 116 may allow authorized users to set user access permissions to various content resources, monitor resource usage by users and devices 106, and perform analyses and generate reports on specific network users and/or devices (e.g., resource usage tracking reports, training evaluations, etc.).

Pattern server 118 may include hardware and software components to initiate various functions related to pattern manipulation as well as interacting with other components within the content distribution network. The pattern server 118 can compare stored patterns to incoming patters and linked values to generate pattern values that are used to dictate certain workflows performed by the content management server 102. The pattern server 118 may also store the incoming patterns and linked values in appropriate data stores. Pattern server 118 comprises a pattern engine and associated functionality.

The content distribution network 100 may include one or more communication networks 120. Although only a single network 120 is identified in FIG. 1, the content distribution network 100 may include any number of different communication networks between any of the computer servers and devices shown in FIG. 1 and/or other devices described herein. Communication networks 120 may enable communication between the various computing devices, servers, and other components of the content distribution network 100. As discussed below, various implementations of content distribution networks 100 may employ different types of networks 120, for example, computer networks, telecommunications networks, wireless networks, and/or any combination of these and/or other networks.

The content distribution network 100 may include one or several navigation systems or features including, for example, the Global Positioning System ("GPS"), GALILEO, or the like, or location systems or features including, for example, one or several transceivers that can determine location of the one or several components of the content distribution network 100 via, for example, triangulation. All of these are depicted as navigation system 122.

In some embodiments, navigation system 122 can include or several features that can communicate with one or several components of the content distribution network 100 including, for example, with one or several of the user devices 106 and/or with one or several of the supervisor devices 110. In some embodiments, this communication can include the transmission of a signal from the navigation system 122 which signal is received by one or several components of the content distribution network 100 and can be used to determine the location of the one or several components of the content distribution network 100.

Figure 2:
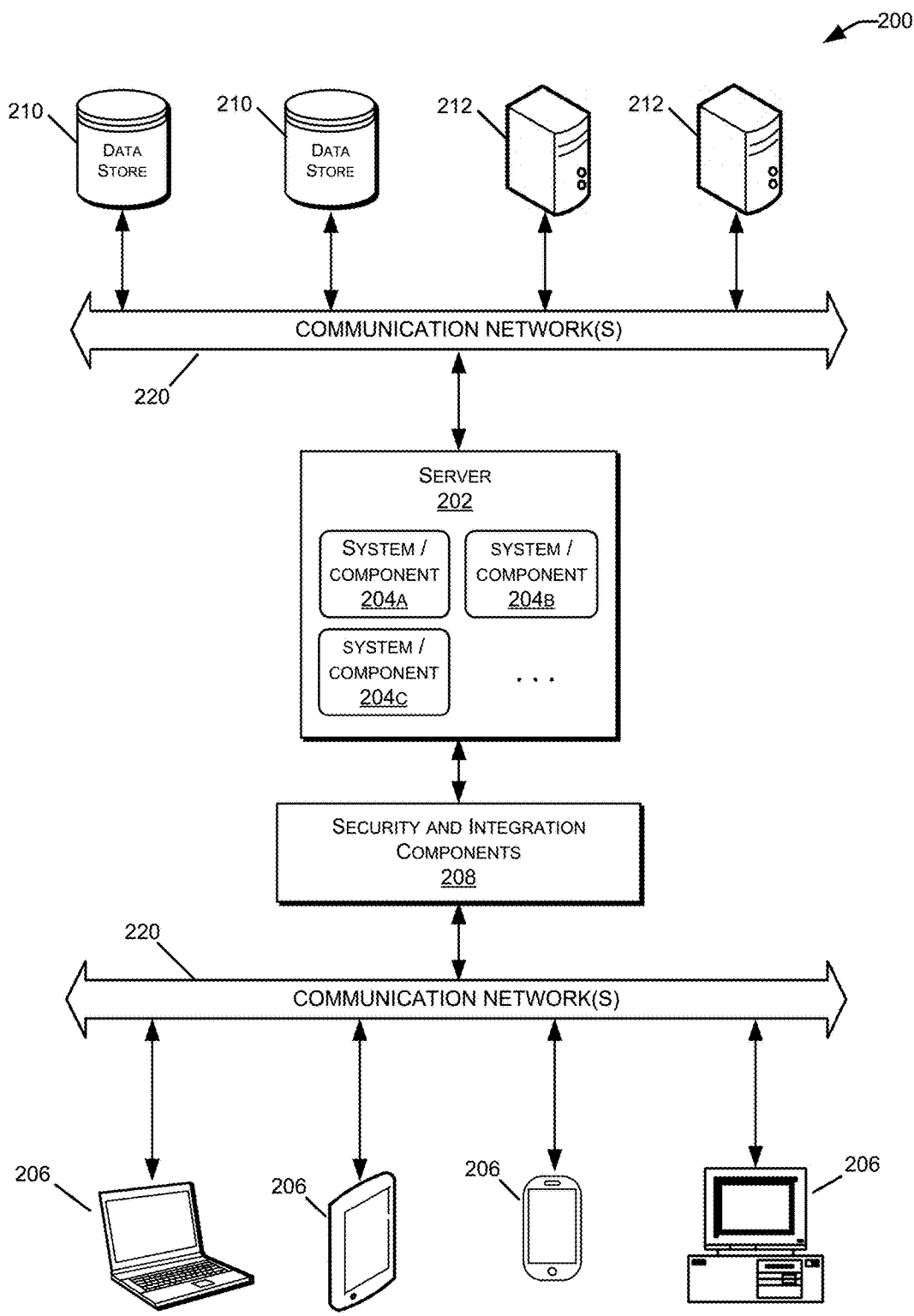
FIG. 2 is a block diagram illustrating a computer server and computing environment within a content distribution network.

With reference to FIG. 2, an illustrative distributed computing environment 200 is shown including a computer server 202, four client computing devices 206, and other components that may implement certain embodiments and features described herein. In some embodiments, the server 202 may correspond to the content management server 102 discussed above in FIG. 1, and the client computing devices 206 may correspond to the user devices 106. However, the computing environment 200 illustrated in FIG. 2 may correspond to any other combination of devices and servers configured to implement a client-server model or other distributed computing architecture.

Client devices 206 may be configured to receive and execute client applications over one or more networks 220. Such client applications may be web browser based applications and/or standalone software applications, such as mobile device applications. Server 202 may be communicatively coupled with the client devices 206 via one or more communication networks 220. Client devices 206 may receive client applications from server 202 or from other application providers (e.g., public or private application stores). Server 202 may be configured to run one or more server software applications or services, for example, web-based or cloud-based services, to support content distribution and interaction with client devices 206. Users operating client devices 206 may in turn utilize one or more client applications (e.g., virtual client applications) to interact with server 202 to utilize the services provided by these components.

Various different subsystems and/or components 204 may be implemented on server 202. Users operating the client devices 206 may initiate one or more client applications to use services provided by these subsystems and components. The subsystems and components within the server 202 and client devices 206 may be implemented in hardware, firmware, software, or combinations thereof. Various different system configurations are possible in different distributed computing systems 200 and content distribution networks 100. The embodiment shown in FIG. 2 is thus one example of a distributed computing system and is not intended to be limiting.

Although exemplary computing environment 200 is shown with four client computing devices 206, any number of client computing devices may be supported. Other devices, such as specialized sensor devices, etc., may interact with client devices 206 and/or server 202.

As shown in FIG. 2, various security and integration components 208 may be used to send and manage communications between the server 202 and user devices 206 over one or more communication networks 220. The security and integration components 208 may include separate servers, such as web servers and/or authentication servers, and/or specialized networking components, such as firewalls, routers, gateways, load balancers, and the like. In some cases, the security and integration components 208 may correspond to a set of dedicated hardware and/or software operating at the same physical location and under the control of same entities as server 202. For example, components 208 may include one or more dedicated web servers and network hardware in a datacenter or a cloud infrastructure. In other examples, the security and integration components 208 may correspond to separate hardware and software components which may be operated at a separate physical location and/or by a separate entity.

Security and integration components 208 may implement various security features for data transmission and storage, such as authenticating users and restricting access to unknown or unauthorized users. In various implementations, security and integration components 208 may provide, for example, a file-based integration scheme or a service-based integration scheme for transmitting data between the various devices in the content distribution network 100. Security and integration components 208 also may use secure data transmission protocols and/or encryption for data transfers, for example, File Transfer Protocol (FTP), Secure File Transfer Protocol (SFTP), and/or Pretty Good Privacy (PGP) encryption.

In some embodiments, one or more web services may be implemented within the security and integration components 208 and/or elsewhere within the content distribution network 100. Such web services, including cross-domain and/or cross-platform web services, may be developed for enterprise use in accordance with various web service standards, such as RESTful web services (i.e., services based on the Representation State Transfer (REST) architectural style and constraints), and/or web services designed in accordance with the Web Service Interoperability (WS-I) guidelines. Some web services may use the Secure Sockets Layer (SSL) or Transport Layer Security (TLS) protocol to provide secure connections between the server 202 and user devices 206. SSL or TLS may use HTTP or HTTPS to provide authentication and confidentiality. In other examples, web services may be implemented using REST over HTTPS with the OAuth open standard for authentication, or using the WS-Security standard which provides for secure SOAP messages using XML encryption. In other examples, the security and integration components 208 may include specialized hardware for providing secure web services. For example, security and integration components 208 may include secure network appliances having built-in features such as hardware-accelerated SSL and HTTPS, WS-Security, and firewalls. Such specialized hardware may be installed and configured in front of any web servers, so that any external devices may communicate directly with the specialized hardware.

Communication network(s) 220 may be any type of network familiar to those skilled in the art that can support data communications using any of a variety of commercially-available protocols, including without limitation, TCP/IP (transmission control protocol/Internet protocol), SNA (systems network architecture), IPX (Internet packet exchange), Secure Sockets Layer (SSL) or Transport Layer Security (TLS) protocols, Hyper Text Transfer Protocol (HTTP) and Secure Hyper Text Transfer Protocol (HTTPS), Bluetooth®, Near Field Communication (NFC), and the like. Merely by way of example, network(s) 220 may be local area networks (LAN), such as one based on Ethernet, Token-Ring and/or the like. Network(s) 220 also may be wide-area networks, such as the Internet. Networks 220 may include telecommunication networks such as a public switched telephone networks (PSTNs), or virtual networks such as an intranet or an extranet. Infrared and wireless networks (e.g., using the Institute of Electrical and Electronics (IEEE) 802.11 protocol suite or other wireless protocols) also may be included in networks 220.

Computing environment 200 also may include one or more data stores 210 and/or back-end servers 212. In certain examples, the data stores 210 may correspond to data store server(s) 104 discussed above in FIG. 1, and back-end servers 212 may correspond to the various back-end servers 112-116. Data stores 210 and servers 212 may reside in the same datacenter or may operate at a remote location from server 202. In some cases, one or more data stores 210 may reside on a non-transitory storage medium within the server 202. Other data stores 210 and back-end servers 212 may be remote from server 202 and configured to communicate with server 202 via one or more networks 220. In certain embodiments, data stores 210 and back-end servers 212 may reside in a storage-area network (SAN), or may use storage-as-a-service (STaaS) architectural model.

Figure 3:
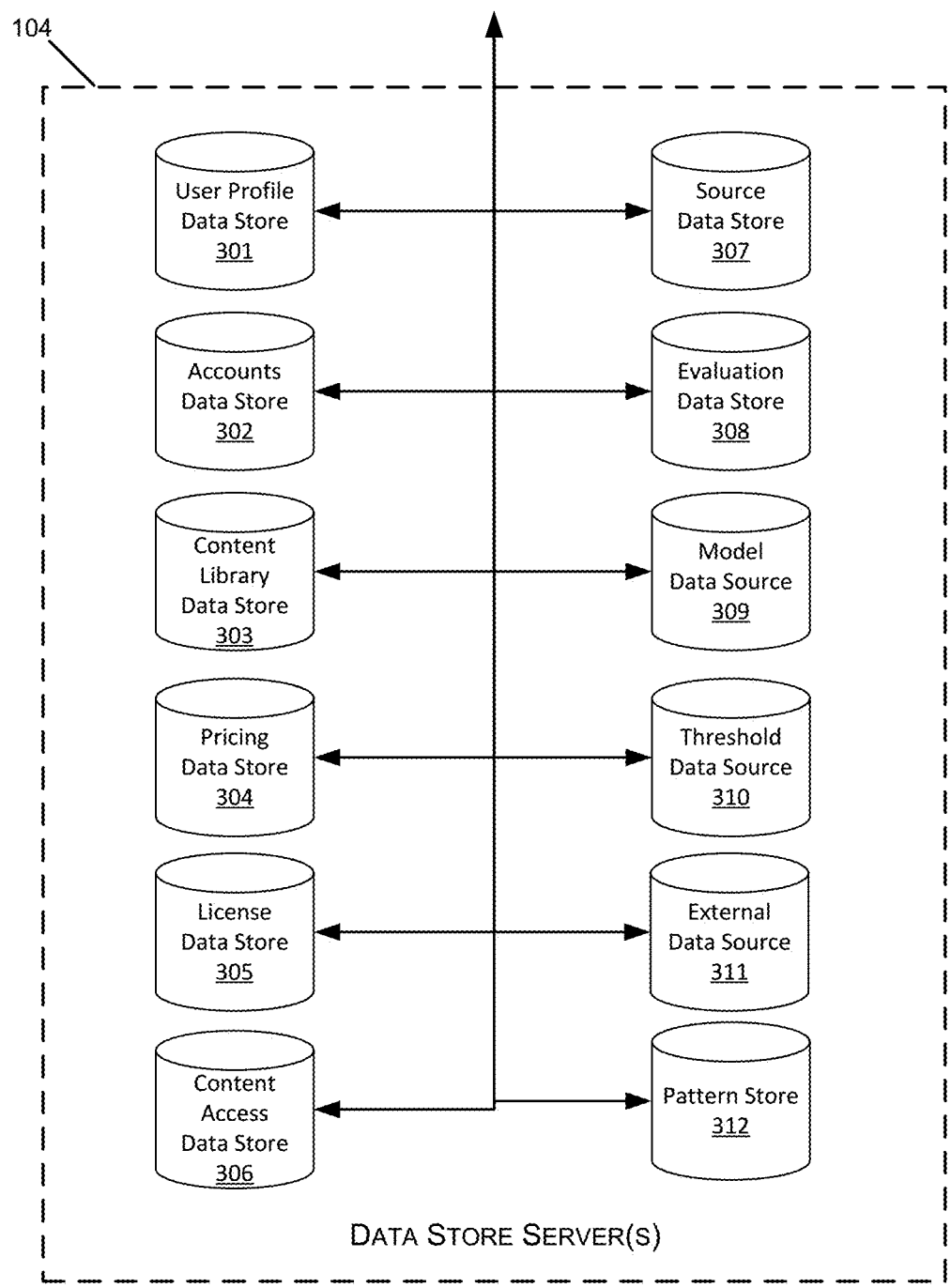
FIG. 3 is a block diagram illustrating an embodiment of one or more data store servers within a content distribution network.

With reference to FIG. 3, an illustrative set of data stores and/or data store servers is shown, corresponding to the data store servers 104 of the content distribution network 100 discussed above in FIG. 1. One or more individual data stores 301-312 may reside in storage on a single computer server 104 (or a single server farm or cluster) under the control of a single entity, or may reside on separate servers operated by different entities and/or at remote locations. In some embodiments, data stores 301-311 may be accessed by the content management server 102 and/or other devices and servers within the network 100 (e.g., user devices 106, supervisor devices 110, administrator servers 116, etc.). Access to one or more of the data stores 301-311 may be limited or denied based on the processes, user credentials, and/or devices attempting to interact with the data store.

The paragraphs below describe examples of specific data stores that may be implemented within some embodiments of a content distribution network 100. It should be understood that the below descriptions of data stores 301-312, including their functionality and types of data stored therein, are illustrative and non-limiting. Data stores server architecture, design, and the execution of specific data stores 301-312 may depend on the context, size, and functional requirements of a content distribution network 100. For example, in content distribution systems 100 used for professional training and educational purposes, separate databases or file-based storage systems may be implemented in data store server(s) 104 to store trainee and/or student data, trainer and/or professor data, training module data and content descriptions, training results, evaluation data, and the like. In contrast, in content distribution systems 100 used for media distribution from content providers to subscribers, separate data stores may be implemented in data stores server(s) 104 to store listings of available content titles and descriptions, content title usage statistics, subscriber profiles, account data, payment data, network usage statistics, etc.

A user profile data store 301, also referred to herein as a user profile database 301, may include information relating to the end users within the content distribution network 100.

This information may include user characteristics such as the user names, access credentials (e.g., logins and passwords), user preferences, and information relating to any previous user interactions within the content distribution network 100 (e.g., requested content, posted content, content modules completed, training scores or evaluations, other associated users, etc.). In some embodiments, this information can relate to one or several individual end users such as, for example, one or several students, teachers, administrators, or the like, and in some embodiments, this information can relate to one or several institutional end users such as, for example, one or several schools, groups of schools such as one or several school districts, one or several colleges, one or several universities, one or several training providers, or the like. In some embodiments, this information can identify one or several user memberships in one or several groups such as, for example, a student's membership in a university, school, program, grade, course, class, or the like.

The user profile database 301 can include information relating to a user's status, location, or the like. This information can identify, for example, a device a user is using, the location of that device, or the like. In some embodiments, this information can be generated based on any location detection technology including, for example, a navigation system 122, or the like.

Information relating to the user's status can identify, for example, logged-in status information that can indicate whether the user is presently logged-in to the content distribution network 100 and/or whether the log-in-is active. In some embodiments, the information relating to the user's status can identify whether the user is currently accessing content and/or participating in an activity from the content distribution network 100.

In some embodiments, information relating to the user's status can identify, for example, one or several attributes of the user's interaction with the content distribution network 100, and/or content distributed by the content distribution network 100. This can include data identifying the user's interactions with the content distribution network 100, the content consumed by the user through the content distribution network 100, or the like. In some embodiments, this can include data identifying the type of information accessed through the content distribution network 100 and/or the type of activity performed by the user via the content distribution network 100, the lapsed time since the last time the user accessed content and/or participated in an activity from the content distribution network 100, or the like. In some embodiments, this information can relate to a content program comprising an aggregate of data, content, and/or activities, and can identify, for example, progress through the content program, or through the aggregate of data, content, and/or activities forming the content program. In some embodiments, this information can track, for example, the amount of time since participation in and/or completion of one or several types of activities, the amount of time since communication with one or several supervisors and/or supervisor devices 110, or the like.

In some embodiments in which the one or several end users are individuals, and specifically are students, the user profile database 301 can further include information relating to these students' academic and/or educational history. This information can identify one or several courses of study that the student has initiated, completed, and/or partially completed, as well as grades received in those courses of study. In some embodiments, the student's academic and/or educational history can further include information identifying student performance on one or several tests, quizzes, and/or assignments. In some embodiments, this information can be stored in a tier of memory that is not the fastest memory in the content delivery network 100.

The user profile database 301 can include information relating to one or several student learning preferences. In some embodiments, for example, the user, also referred to herein as the student or the student-user may have one or several preferred learning styles, one or several most effective learning styles, and/or the like. In some embodiments, the student's learning style can be any learning style describing how the student best learns or how the student prefers to learn. In one embodiment, these learning styles can include, for example, identification of the student as an auditory learner, as a visual learner, and/or as a tactile learner. In some embodiments, the data identifying one or several student learning styles can include data identifying a learning style based on the student's educational history such as, for example, identifying a student as an auditory learner when the student has received significantly higher grades and/or scores on assignments and/or in courses favorable to auditory learners. In some embodiments, this information can be stored in a tier of memory that is not the fastest memory in the content delivery network 100.

In some embodiments, the user profile data store 301 can further include information identifying one or several user skill levels. In some embodiments, these one or several user skill levels can identify a skill level determined based on past performance by the user interacting with the content delivery network 100, and in some embodiments, these one or several user skill levels can identify a predicted skill level determined based on past performance by the user interacting with the content delivery network 100 and one or several predictive models.

In yet other embodiments the user profile data store 301 can include a user patterns store containing digitally captured facial expressions of the user. These patterns can be linked to pattern values that represent the sentiment expressed at the time of capture. For instance, a first pattern may be associated to a first value where the first value indicates the user was sad, happy, bored, frustrated, angry, etc. These patterns and values can further be used to evaluate the user, the delivered content, the content provider, the content delivery method, etc. For instance, a value that indicates the student is bored could mean that the content being delivered is not at a high enough level, at too high of a level, is not interesting to the user, etc.

The user profile database 301 can further include information relating to one or several teachers and/or instructors who are responsible for organizing, presenting, and/or managing the presentation of information to the student. In some embodiments, user profile database 301 can include information identifying courses and/or subjects that have been taught by the teacher, data identifying courses and/or subjects currently taught by the teacher, and/or data identifying courses and/or subjects that will be taught by the teacher. In some embodiments, this can include information relating to one or several teaching styles of one or several teachers. In some embodiments, the user profile database 301 can further include information indicating past evaluations and/or evaluation reports received by the teacher. In some embodiments, the user profile database 301 can further include information relating to improvement suggestions received by the teacher, training received by the teacher, continuing education received by the teacher, and/or the like. In some embodiments, this information can be stored in a tier of memory that is not the fastest memory in the content delivery network 100.

An accounts data store 302, also referred to herein as an accounts database 302, may generate and store account data for different users in various roles within the content distribution network 100. For example, accounts may be created in an accounts data store 302 for individual end users, supervisors, administrator users, and entities such as companies or educational institutions. Account data may include account types, current account status, account characteristics, and any parameters, limits, restrictions associated with the accounts.

A content library data store 303, also referred to herein as a content library database 303, may include information describing the individual content items (or content resources or data packets) available via the content distribution network 100. In some embodiments, these data packets in the content library database 303 can be linked to form an object network. In some embodiments, these data packets can be linked in the object network according to one or several prerequisite relationships that can, for example, identify the relative hierarchy and/or difficulty of the data objects. In some embodiments, this hierarchy of data objects can be generated by the content distribution network 100 according to user experience with the object network, and in some embodiments, this hierarchy of data objects can be generated based on one or several existing and/or external hierarchies such as, for example, a syllabus, a table of contents, or the like. In some embodiments, for example, the object network can correspond to a syllabus such that content for the syllabus is embodied in the object network.

In some embodiments, the content library data store 303 can comprise a syllabus, a schedule, or the like. In some embodiments, the syllabus or schedule can identify one or several tasks and/or events relevant to the user. In some embodiments, for example, when the user is a member of a group such as, a section or a class, these tasks and/or events relevant to the user can identify one or several assignments, quizzes, exams, or the like.

In some embodiments, the library data store 303 may include metadata, properties, and other characteristics associated with the content resources stored in the content server 112. Such data may identify one or more aspects or content attributes of the associated content resources, for example, subject matter, access level, or skill level of the content resources, license attributes of the content resources (e.g., any limitations and/or restrictions on the licensable use and/or distribution of the content resource), price attributes of the content resources (e.g., a price and/or price structure for determining a payment amount for use or distribution of the content resource), rating attributes for the content resources (e.g., data indicating the evaluation or effectiveness of the content resource), and the like. In some embodiments, the library data store 303 may be configured to allow updating of content metadata or properties, and to allow the addition and/or removal of information relating to the content resources. For example, content relationships may be implemented as graph structures, which may be stored in the library data store 303 or in an additional store for use by selection algorithms along with the other metadata.

In some embodiments, the content library data store 303 can contain information used in evaluating responses received from users. In some embodiments, for example, a user can receive content from the content distribution network 100 and can, subsequent to receiving that content, provide a response to the received content. In some embodiments, for example, the received content can comprise one or several questions, prompts, or the like, and the response to the received content can comprise an answer to those one or several questions, prompts, or the like. In some embodiments, information, referred to herein as "comparative data," from the content library data store 303 can be used to determine whether the responses are the correct and/or desired responses.

In some embodiments, the content library database 303 and/or the user profile database 301 can comprise an aggregation network also referred to herein as a content network are content aggregation network. The aggregation network can comprise a plurality of content aggregations that can be linked together by, for example: creation by common user; relation to a common subject, topic, skill, or the like; creation from a common set of source material such as source data packets; or the like. In some embodiments, the content aggregation can comprise a grouping of content comprising the presentation portion that can be provided to the user in the form of, for example, a flash card and an extraction portion that can comprise the desired response to the presentation portion such as for example, an answer to a flash card. In some embodiments, one or several content aggregations can be generated by the content distribution network 100 and can be related to one or several data packets they can be, for example, organized in object network. In some embodiments, the one or several content aggregations can be each created from content stored in one or several of the data packets.

In some embodiments, the content aggregations located in the content library database 303 and/or the user profile database 301 can be associated with a user-creator of those content aggregations. In some embodiments, access to content aggregations can vary based on, for example, whether a user created the content aggregations. In some embodiments, the content library database 303 and/or the user profile database 301 can comprise a database of content aggregations associated with a specific user, and in some embodiments, the content library database 303 and/or the user profile database 301 can comprise a plurality of databases of content aggregations that are each associated with a specific user. In some embodiments, these databases of content aggregations can include content aggregations created by their specific user and in some embodiments, these databases of content aggregations can further include content aggregations selected for inclusion by their specific user and/or a supervisor of that specific user. In some embodiments, these content aggregations can be arranged and/or linked in a hierarchical relationship similar to the data packets in the object network and/or linked to the object network in the object network or the tasks or skills associated with the data packets in the object network or the syllabus or schedule.

In some embodiments, the content aggregation network, and the content aggregations forming the content aggregation network can be organized according to the object network and/or the hierarchical relationships embodied in the object network. In some embodiments, the content aggregation network, and/or the content aggregations forming the content aggregation network can be organized according to one or several tasks identified in the syllabus, schedule or the like.

A pricing data store 304 may include pricing information and/or pricing structures for determining payment amounts for providing access to the content distribution network 100 and/or the individual content resources within the network 100. In some cases, pricing may be determined based on a user's access to the content distribution network 100, for example, a time-based subscription fee, or pricing based on network usage and. In other cases, pricing may be tied to specific content resources. Certain content resources may have associated pricing information, whereas other pricing determinations may be based on the resources accessed, the profiles and/or accounts of the user, and the desired level of access (e.g., duration of access, network speed, etc.). Additionally, the pricing data store 304 may include information relating to compilation pricing for groups of content resources, such as group prices and/or price structures for groupings of resources.

A license data store 305 may include information relating to licenses and/or licensing of the content resources within the content distribution network 100. For example, the license data store 305 may identify licenses and licensing terms for individual content resources and/or compilations of content resources in the content server 112, the rights holders for the content resources, and/or common or large-scale right holder information such as contact information for rights holders of content not included in the content server 112.

A content access data store 306 may include access rights and security information for the content distribution network 100 and specific content resources. For example, the content access data store 306 may include login information (e.g., user identifiers, logins, passwords, etc.) that can be verified during user login attempts to the network 100. The content access data store 306 also may be used to store assigned user roles and/or user levels of access. For example, a user's access level may correspond to the sets of content resources and/or the client or server applications that the user is permitted to access. Certain users may be permitted or denied access to certain applications and resources based on their subscription level, training program, course/grade level, etc. Certain users may have supervisory access over one or more end users, allowing the supervisor to access all or portions of the end user's content, activities, evaluations, etc. Additionally, certain users may have administrative access over some users and/or some applications in the content management network 100, allowing such users to add and remove user accounts, modify user access permissions, perform maintenance updates on software and servers, etc.

A source data store 307 may include information relating to the source of the content resources available via the content distribution network. For example, a source data store 307 may identify the authors and originating devices of content resources, previous pieces of data and/or groups of data originating from the same authors or originating devices, and the like.

An evaluation data store 308 may include information used to direct the evaluation of users and content resources in the content management network 100. In some embodiments, the evaluation data store 308 may contain, for example, the analysis criteria and the analysis guidelines for evaluating users (e.g., trainees/students, gaming users, media content consumers, etc.) and/or for evaluating the content resources in the network 100. The evaluation data store 308 also may include information relating to evaluation processing tasks, for example, the identification of users and user devices 106 that have received certain content resources or accessed certain applications, the status of evaluations or evaluation histories for content resources, users, or applications, and the like. Evaluation criteria may be stored in the evaluation data store 308 including data and/or instructions in the form of one or several electronic rubrics or scoring guides for use in the evaluation of the content, users, or applications. The evaluation data store 308 also may include past evaluations and/or evaluation analyses for users, content, and applications, including relative rankings, characterizations, explanations, and the like. Evaluation data store 308 also includes evaluations tabulated from pattern detection for content including instructional content and instructors.

A model data store 309, also referred to herein as a model database 309 can store information relating to one or several predictive models. In some embodiments, these can include one or several evidence models, risk models, skill models, or the like. In some embodiments, an evidence model can be a mathematically-based statistical model. The evidence model can be based on, for example, Item Response Theory (IRT), Bayesian Network (Bayes net), Performance Factor Analysis (PFA), or the like. The evidence model can, in some embodiments, be customizable to a user and/or to one or several content items. Specifically, one or several inputs relating to the user and/or to one or several content items can be inserted into the evidence model. These inputs can include, for example, one or several measures of user skill level, one or several measures of content item difficulty and/or skill level, or the like. The customized evidence model can then be used to predict the likelihood of the user providing desired or undesired responses to one or several of the content items.

In some embodiments, the risk models can include one or several models that can be used to calculate one or several model function values. In some embodiments, these one or several model function values can be used to calculate a risk probability, which risk probability can characterize the risk of a user such as a student-user failing to achieve a desired outcome such as, for example, failing to correctly respond to one or several data packets, failure to achieve a desired level of completion of a program, for example in a pre-defined time period, failure to achieve a desired learning outcome, or the like. In some embodiments, the risk probability can identify the risk of the student-user failing to complete 60% of the program.

In some embodiments, these models can include a plurality of model functions including, for example, a first model function, a second model function, a third model function, and a fourth model function. In some embodiments, some or all of the model functions can be associated with a portion of the program such as, for example a completion stage and/or completion status of the program. In one embodiment, for example, the first model function can be associated with a first completion status, the second model function can be associated with a second completion status, the third model function can be associated with a third completion status, and the fourth model function can be associated with a fourth completion status. In some embodiments, these completion statuses can be selected such that some or all of these completion statuses are less than the desired level of completion of the program. Specifically, in some embodiments, these completion status can be selected to all be at less than 60% completion of the program, and more specifically, in some embodiments, the first completion status can be at 20% completion of the program, the second completion status can be at 30% completion of the program, the third completion status can be at 40% completion of the program, and the fourth completion status can be at 50% completion of the program. Similarly, any desired number of model functions can be associated with any desired number of completion statuses.

In some embodiments, a model function can be selected from the plurality of model functions based on a student-user's progress through a program. In some embodiments, the student-user's progress can be compared to one or several status trigger thresholds, each of which status trigger thresholds can be associated with one or more of the model functions. If one of the status triggers is triggered by the student-user's progress, the corresponding one or several model functions can be selected.

The model functions can comprise a variety of types of models and/or functions. In some embodiments, each of the model functions outputs a function value that can be used in calculating a risk probability. This function value can be calculated by performing one or several mathematical operations on one or several values indicative of one or several user attributes and/or user parameters, also referred to herein as program status parameters. In some embodiments, each of the model functions can use the same program status parameters, and in some embodiments, the model functions can use different program status parameters. In some embodiments, the model functions use different program status parameters when at least one of the model functions uses at least one program status parameter that is not used by others of the model functions.

In some embodiments, a skill model can comprise a statistical model identifying a predictive skill level of one or several students. In some embodiments, this model can identify a single skill level of a student and/or a range of possible skill levels of a student. In some embodiments, this statistical model can identify a skill level of a student-user and an error value or error range associated with that skill level. In some embodiments, the error value can be associated with a confidence interval determined based on a confidence level. Thus, in some embodiments, as the number of student interactions with the content distribution network increases, the confidence level can increase and the error value can decrease such that the range identified by the error value about the predicted skill level is smaller.

A threshold database 310, also referred to herein as a threshold database, can store one or several threshold values. These one or several threshold values can delineate between states or conditions. In one exemplary embodiments, for example, a threshold value can delineate between an acceptable user performance and an unacceptable user performance, between content appropriate for a user and content that is inappropriate for a user, between risk levels, or the like.

In addition to the illustrative data stores described above, data store server(s) 104 (e.g., database servers, file-based storage servers, etc.) may include one or more external data aggregators 311. External data aggregators 311 may include third-party data sources accessible to the content management network 100, but not maintained by the content management network 100. External data aggregators 311 may include any electronic information source relating to the users, content resources, or applications of the content distribution network 100. For example, external data aggregators 311 may be third-party data stores containing demographic data, education related data, consumer sales data, health related data, and the like. Illustrative external data aggregators 311 may include, for example, social networking web servers, public records data stores, learning management systems, educational institution servers, business servers, consumer sales data stores, medical record data stores, etc. Data retrieved from various external data aggregators 311 may be used to verify and update user account information, suggest user content, and perform user and content evaluations.

A pattern store 312 is a database containing patterns with linked values. The patterns represent digitized facial expressions of a multitude of people and the linked values are the sentiments corresponding to the facial expression at the time the digital pattern was captured. In some cases sentiment values can be averaged over the multitude of patterns with the same sentiment value and or remain searchable for each pattern and linked value. This is thus a generic pattern database since the patterns and linked values are not associated with a particular user of the content distribution network 100, although it could be comprised of patterns and values of all or a portion of the users of the content distribution network 100.

Figure 4:
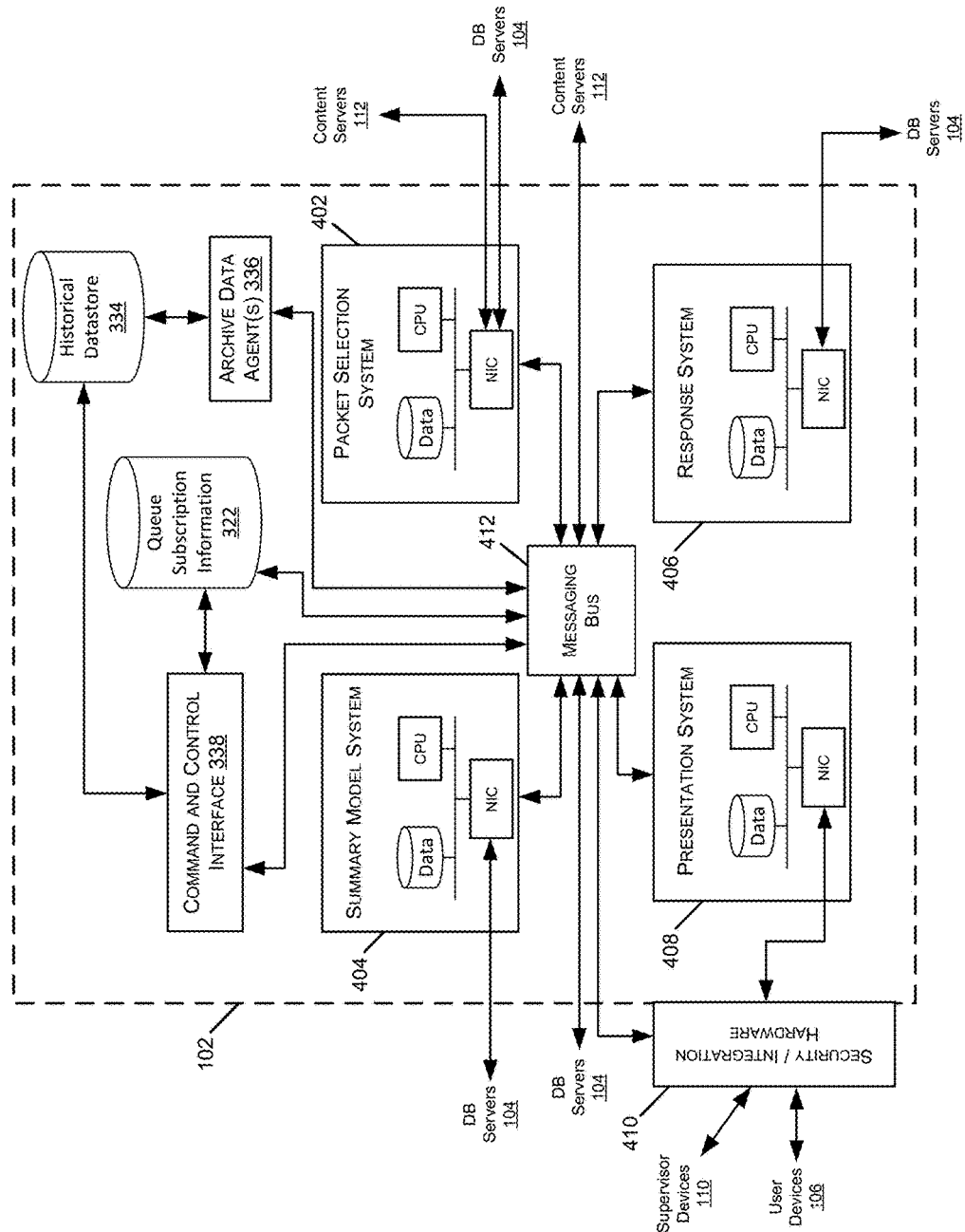
FIG. 4 is a block diagram illustrating an embodiment of one or more content management servers within a content distribution network.

With reference now to FIG. 4, a block diagram is shown illustrating an embodiment of one or more content management servers 102 within a content distribution network 100. In such an embodiment, content management server 102 performs internal data gathering and processing of streamed content along with external data gathering and processing. Other embodiments could have either all external or all internal data gathering. This embodiment allows reporting timely information that might be of interest to the reporting party or other parties. In this embodiment, the content management server 102 can monitor gathered information from several sources to allow it to make timely business and/or processing decisions based upon that information. For example, reports of user actions and/or responses, as well as the status and/or results of one or several processing tasks could be gathered and reported to the content management server 102 from a number of sources.

Internally, the content management server 102 gathers information from one or more internal components 402-408. The internal components 402-408 gather and/or process information relating to such things as: content provided to users; content consumed by users; responses provided by users; user skill levels; content difficulty levels; next content for providing to users; etc. The internal components 402-408 can report the gathered and/or generated information in real-time, near real-time or along another time line. To account for any delay in reporting information, a time stamp or staleness indicator can inform others of how timely the information was sampled. The content management server 102 can opt to allow third parties to use internally or externally gathered information that is aggregated within the server 102 by subscription to the content distribution network 100.

A command and control (CC) interface 338 configures the gathered input information to an output of data streams, also referred to herein as content streams. APIs for accepting gathered information and providing data streams are provided to third parties external to the server 102 who want to subscribe to data streams. The server 102 or a third party can design as yet undefined APIs using the CC interface 338. The server 102 can also define authorization and authentication parameters using the CC interface 338 such as authentication, authorization, login, and/or data encryption. CC information is passed to the internal components 402-408 and/or other components of the content distribution network 100 through a channel separate from the gathered information or data stream in this embodiment, but other embodiments could embed CC information in these communication channels. The CC information allows throttling information reporting frequency, specifying formats for information and data streams, deactivation of one or several internal components 402-408 and/or other components of the content distribution network 100, updating authentication and authorization, etc.

The various data streams that are available can be researched and explored through the CC interface 338. Those data stream selections for a particular subscriber, which can be one or several of the internal components 402-408 and/or other components of the content distribution network 100, are stored in the queue subscription information database 322. The server 102 and/or the CC interface 338 then routes selected data streams to processing subscribers that have selected delivery of a given data stream. Additionally, the server 102 also supports historical queries of the various data streams that are stored in an historical data store 334 as gathered by an archive data agent 336. Through the CC interface 238 various data streams can be selected for archiving into the historical data store 334.

Components of the content distribution network 100 outside of the server 102 can also gather information that is reported to the server 102 in real-time, near real-time or along another time line. There is a defined API between those components and the server 102. Each type of information or variable collected by server 102 falls within a defined API or multiple APIs. In some cases, the CC interface 338 is used to define additional variables to modify an API that might be of use to processing subscribers. The additional variables can be passed to all processing subscribes or just a subset. For example, a component of the content distribution network 100 outside of the server 102 may report a user response but define an identifier of that user as a private variable that would not be passed to processing subscribers lacking access to that user and/or authorization to receive that user data. Processing subscribers having access to that user and/or authorization to receive that user data would receive the subscriber identifier along with response reported that component. Encryption and/or unique addressing of data streams or sub-streams can be used to hide the private variables within the messaging queues.

The user devices 106 and/or supervisor devices 110 communicate with the server 102 through security and/or integration hardware 410. The communication with security and/or integration hardware 410 can be encrypted or not. For example, a socket using a TCP connection could be used. In addition to TCP, other transport layer protocols like SCTP and UDP could be used in some embodiments to intake the gathered information. A protocol such as SSL could be used to protect the information over the TCP connection. Authentication and authorization can be performed to any user devices 106 and/or supervisor device interfacing to the server 102. The security and/or integration hardware 410 receives the information from one or several of the user devices 106 and/or the supervisor devices 110 by providing the API and any encryption, authorization, and/or authentication. In some cases, the security and/or integration hardware 410 reformats or rearranges this received information The messaging bus 412, also referred to herein as a messaging queue or a messaging channel, can receive information from the internal components of the server 102 and/or components of the content distribution network 100 outside of the server 102 and distribute the gathered information as a data stream to any processing subscribers that have requested the data stream from the messaging queue 412. Specifically, in some embodiments, the messaging bus 412 can receive and output information from at least one of the packet selection system, the presentation system, the response system, and the summary model system. In some embodiments, this information can be output according to a "push" model, and in some embodiments, this information can be output according to a "pull" model.

As indicated in FIG. 4, processing subscribers are indicated by a connector to the messaging bus 412, the connector having an arrow head pointing away from the messaging bus 412. Only data streams within the messaging queue 412 that a particular processing subscriber has subscribed to may be read by that processing subscriber if received at all. Gathered information sent to the messaging queue 412 is processed and returned in a data stream in a fraction of a second by the messaging queue 412. Various multicasting and routing techniques can be used to distribute a data stream from the messaging queue 412 that a number of processing subscribers have requested. Protocols such as Multicast or multiple Unicast could be used to distributed streams within the messaging queue 412. Additionally, transport layer protocols like TCP, SCTP and UDP could be used in various embodiments.

Through the CC interface 338, an external or internal processing subscriber can be assigned one or more data streams within the messaging queue 412. A data stream is a particular type of messages in a particular category. For example, a data stream can comprise all of the data reported to the messaging bus 412 by a designated set of components. One or more processing subscribers could subscribe and receive the data stream to process the information and make a decision and/or feed the output from the processing as gathered information fed back into the messaging queue 412. Through the CC interface 338 a developer can search the available data streams or specify a new data stream and its API. The new data stream might be determined by processing a number of existing data streams with a processing subscriber.

The CDN 110 has internal processing subscribers 402-408 that process assigned data streams to perform functions within the server 102. Internal processing subscribers 402-408 could perform functions such as providing content to a user, receiving a response from a user, determining the correctness of the received response, updating one or several models based on the correctness of the response, recommending new content for providing to one or several users, or the like. The internal processing subscribers 402-408 can decide filtering and weighting of records from the data stream. To the extent that decisions are made based upon analysis of the data stream, each data record is time stamped to reflect when the information was gathered such that additional credibility could be given to more recent results, for example. Other embodiments may filter out records in the data stream that are from an unreliable source or stale. For example, a particular contributor of information may prove to have less than optimal gathered information and that could be weighted very low or removed altogether.

Internal processing subscribers 402-408 may additionally process one or more data streams to provide different information to feed back into the messaging queue 412 to be part of a different data stream. For example, hundreds of user devices 106 could provide responses that are put into a data stream on the messaging queue 412. An internal processing subscriber 402-408 could receive the data stream and process it to determine the difficulty of one or several data packets provided to one or several users, and supply this information back onto the messaging queue 412 for possible use by other internal and external processing subscribers.

As mentioned above, the CC interface 338 allows the CDN 110 to query historical messaging queue 412 information. An archive data agent 336 listens to the messaging queue 412 to store data streams in a historical database 334. The historical database 334 may store data streams for varying amounts of time and may not store all data streams. Different data streams may be stored for different amounts of time.

With regards to the components 402-48, the content management server(s) 102 may include various server hardware and software components that manage the content resources within the content distribution network 100 and provide interactive and adaptive content to users on various user devices 106. For example, content management server(s) 102 may provide instructions to and receive information from the other devices within the content distribution network 100, in order to manage and transmit content resources, user data, and server or client applications executing within the network 100.

A content management server 102 may include a packet selection system 402. The packet selection system 402 may be implemented using dedicated hardware within the content distribution network 100 (e.g., a packet selection server 402), or using designated hardware and software resources within a shared content management server 102. In some embodiments, the packet selection system 402 may adjust the selection and adaptive capabilities of content resources to match the needs and desires of the users receiving the content. For example, the packet selection system 402 may query various data stores and servers 104 to retrieve user information, such as user preferences and characteristics (e.g., from a user profile data store 301), user access restrictions to content recourses (e.g., from a content access data store 306), previous user results and content evaluations (e.g., from an evaluation data store 308), and the like. Based on the retrieved information from data stores 104 and other data sources, the packet selection system 402 may modify content resources for individual users.

In some embodiments, the packet selection system 402 can include a recommendation engine, also referred to herein as an adaptive recommendation engine. In some embodiments, the recommendation engine can select one or several pieces of content, also referred to herein as data packets, for providing to a user. These data packets can be selected based on, for example, the information retrieved from the database server 104 including, for example, the user profile database 301, the content library database 303, the model database 309, or the like. In some embodiments, these one or several data packets can be adaptively selected and/or selected according to one or several selection rules. In one embodiment, for example, the recommendation engine can retrieve information from the user profile database 301 identifying, for example, a skill level of the user. The recommendation engine can further retrieve information from the content library database 303 identifying, for example, potential data packets for providing to the user and the difficulty of those data packets and/or the skill level associated with those data packets.

The recommendation engine can identify one or several potential data packets for providing and/or one or several data packets for providing to the user based on, for example, one or several rules, models, predictions, or the like. The recommendation engine can use the skill level of the user to generate a prediction of the likelihood of one or several users providing a desired response to some or all of the potential data packets. In some embodiments, the recommendation engine can pair one or several data packets with selection criteria that may be used to determine which packet should be delivered to a student-user based on one or several received responses from that student-user. In some embodiments, one or several data packets can be eliminated from the pool of potential data packets if the prediction indicates either too high a likelihood of a desired response or too low a likelihood of a desired response. In some embodiments, the recommendation engine can then apply one or several selection criteria to the remaining potential data packets to select a data packet for providing to the user. These one or several selection criteria can be based on, for example, criteria relating to a desired estimated time for receipt of response to the data packet, one or several content parameters, one or several assignment parameters, or the like.

A content management server 102 also may include a summary model system 404. The summary model system 404 may be implemented using dedicated hardware within the content distribution network 100 (e.g., a summary model server 404), or using designated hardware and software resources within a shared content management server 102. In some embodiments, the summary model system 404 may monitor the progress of users through various types of content resources and groups, such as media compilations, courses or curriculums in training or educational contexts, interactive gaming environments, and the like. For example, the summary model system 404 may query one or more databases and/or data store servers 104 to retrieve user data such as associated content compilations or programs, content completion status, user goals, results, and the like.

A content management server 102 also may include an response system 406, which can include, in some embodiments, a response processor. The response system 406 may be implemented using dedicated hardware within the content distribution network 100 (e.g., a response server 406), or using designated hardware and software resources within a shared content management server 102. The response system 406 may be configured to receive and analyze information from user devices 106. For example, various ratings of content resources submitted by users may be compiled and analyzed, and then stored in a data store (e.g., a content library data store 303 and/or evaluation data store 308) associated with the content. In some embodiments, the response server 406 may analyze the information to determine the effectiveness or appropriateness of content resources with, for example, a subject matter, an age group, a skill level, or the like. In some embodiments, the response system 406 may provide updates to the packet selection system 402 or the summary model system 404, with the attributes of one or more content resources or groups of resources within the network 100. The response system 406 also may receive and analyze user evaluation data from user devices 106—including patterns associated with facial expressions, supervisor devices 110, and administrator servers 116, etc. For instance, response system 406 may receive, aggregate, and analyze user evaluation data for different types of users (e.g., end users, supervisors, administrators, etc.) in different contexts (e.g., media consumer ratings, trainee or student comprehension levels, teacher effectiveness levels, gamer skill levels, etc.).

In some embodiments, the response system 406 can be further configured to receive one or several responses from the user and analyze these one or several responses. In some embodiments, for example, the response system 406 can be configured to translate the one or several responses into one or several observables. As used herein, an observable is an characterization of a received response. In some embodiments, the translation of the one or several response into one or several observables can include determining whether the one or several response are correct responses, also referred to herein as desired responses, or are incorrect responses, also referred to herein as undesired responses. In some embodiments, the translation of the one or several response into one or several observables can include characterizing the degree to which one or several response are desired responses and/or undesired responses. In some embodiments, one or several values can be generated by the response system 406 to reflect user performance in responding to the one or several data packets. In some embodiments, these one or several values can comprise one or several scores for one or several responses and/or data packets. In other embodiments, the response system 406 can be configured to receive one or more patterns from the user device 106 corresponding with digitized facial expressions made by the user of the user device 106 during delivery of the content. The response system 406 can match sentiment values to workflows and initiate the workflows according to values computed from the patterns received from user devices 106.

A content management server 102 also may include a presentation system 408. The presentation system 408 may be implemented using dedicated hardware within the content distribution network 100 (e.g., a presentation server 408), or using designated hardware and software resources within a shared content management server 102. The presentation system 408 can include a presentation engine that can be, for example, a software module running on the content delivery system.

The presentation system 408, also referred to herein as the presentation module or the presentation engine, may receive content resources from the packet selection system 402 and/or from the summary model system 404, and provide the resources to user devices 106. The presentation system 408 may determine the appropriate presentation format for the content resources based on the user characteristics and preferences, and/or the device capabilities of user devices 106. If needed, the presentation system 408 may convert the content resources to the appropriate presentation format and/or compress the content before transmission. In some embodiments, the presentation system 408 may also determine the appropriate transmission media and communication protocols for transmission of the content resources.

In some embodiments, the presentation system 408 may include specialized security and integration hardware 410, along with corresponding software components to implement the appropriate security features content transmission and storage, to provide the supported network and client access models, and to support the performance and scalability requirements of the network 100. The security and integration layer 410 may include some or all of the security and integration components 208 discussed above in FIG. 2, and may control the transmission of content resources and other data, as well as the receipt of requests and content interactions, to and from the user devices 106, supervisor devices 110, administrative servers 116, and other devices in the network 100.

Figure 5:
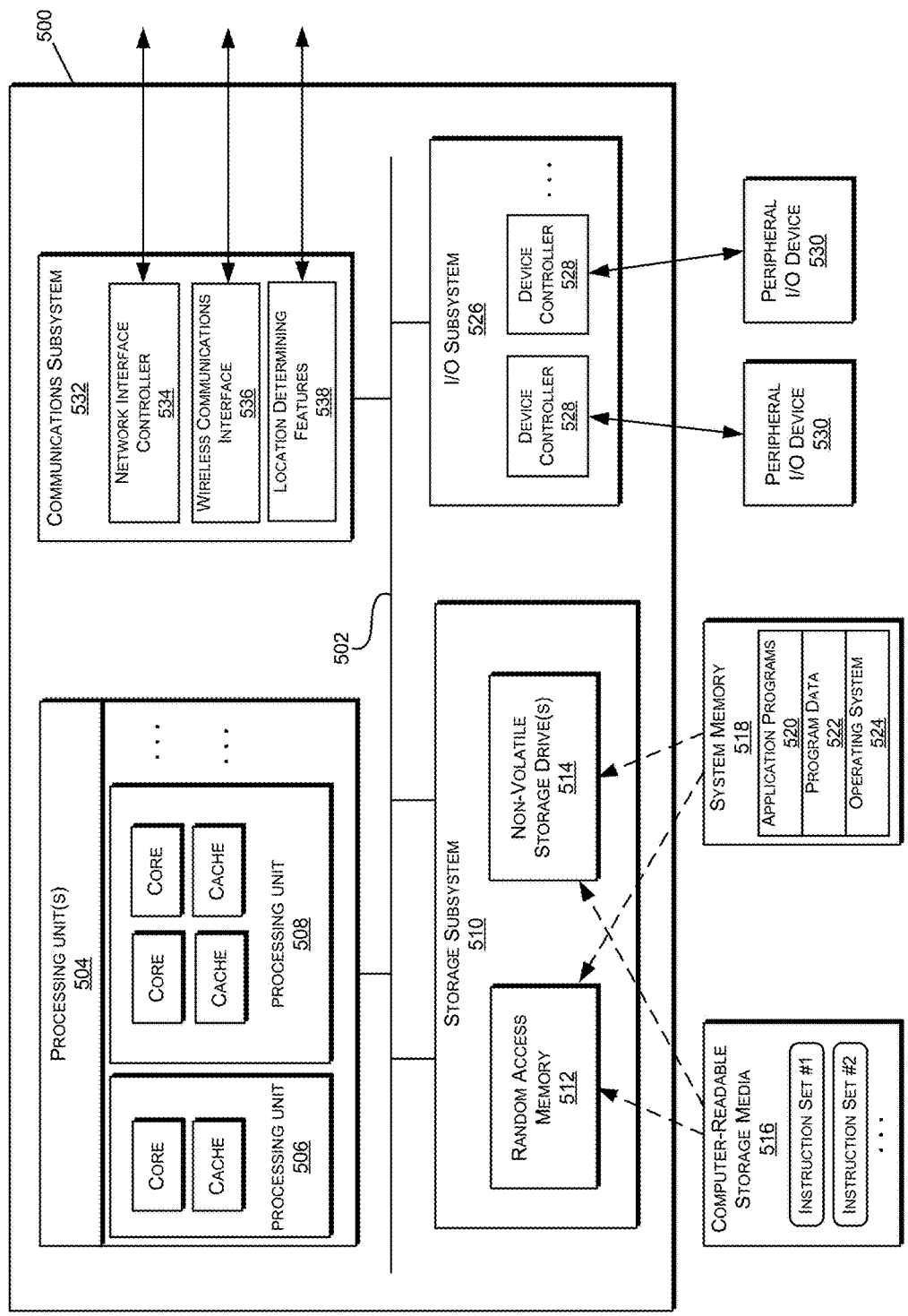
FIG. 5 is a block diagram illustrating the physical and logical components of a special-purpose computer device within a content distribution network.

With reference now to FIG. 5, a block diagram of an illustrative computer system is shown. The system 500 may correspond to any of the computing devices or servers of the content distribution network 100 described above, or any other computing devices described herein, and specifically can include, for example, one or several of the user devices 106, the supervisor device 110, and/or any of the servers 102, 104, 108, 112, 114, 116. In this example, computer system 500 includes processing units 504 that communicate with a number of peripheral subsystems via a bus subsystem 502. These peripheral subsystems include, for example, a storage subsystem 510, an I/O subsystem 526, and a communications subsystem 532.

Bus subsystem 502 provides a mechanism for letting the various components and subsystems of computer system 500 communicate with each other as intended. Although bus subsystem 502 is shown schematically as a single bus, alternative embodiments of the bus subsystem may utilize multiple buses. Bus subsystem 502 may be any of several types of bus structures including a memory bus or memory controller, a peripheral bus, and a local bus using any of a variety of bus architectures. Such architectures may include, for example, an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 504, which may be implemented as one or more integrated circuits (e.g., a conventional microprocessor or microcontroller), controls the operation of computer system 500. One or more processors, including single core and/or multicore processors, may be included in processing unit 504. As shown in the figure, processing unit 504 may be implemented as one or more independent processing units 506 and/or 508 with single or multicore processors and processor caches included in each processing unit. In other embodiments, processing unit 504 may also be implemented as a quad-core processing unit or larger multicore designs (e.g., hexa-core processors, octo-core processors, ten-core processors, or greater.

Processing unit 504 may execute a variety of software processes embodied in program code, and may maintain multiple concurrently executing programs or processes. At any given time, some or all of the program code to be executed can be resident in processor(s) 504 and/or in storage subsystem 510. In some embodiments, computer system 500 may include one or more specialized processors, such as digital signal processors (DSPs), outboard processors, graphics processors, application-specific processors, and/or the like.

I/O subsystem 526 may include device controllers 528 for one or more user interface input devices and/or user interface output devices 530. User interface input and output devices 530 may be integral with the computer system 500 (e.g., integrated audio/video systems, and/or touchscreen displays), or may be separate peripheral devices which are attachable/detachable from the computer system 500. The I/O subsystem 526 may provide one or several outputs to a user by converting one or several electrical signals to user perceptible and/or interpretable form, and may receive one or several inputs from the user by generating one or several electrical signals based on one or several user-caused interactions with the I/O subsystem such as the depressing of a key or button, the moving of a mouse, the interaction with a touchscreen or trackpad, the interaction of a sound wave with a microphone, or the like.

Input devices 530 may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. Input devices 530 may also include three dimensional (3D) mice, joysticks or pointing sticks, gamepads and graphic tablets, and audio/visual devices such as speakers, digital cameras or other image sensors, digital camcorders, portable media players, webcams, image scanners, fingerprint scanners, barcode reader 3D scanners, 3D printers, laser rangefinders, and eye gaze tracking devices. Additional input devices 530 may include, for example, motion sensing and/or gesture recognition devices that enable users to control and interact with an input device through a natural user interface using gestures and spoken commands, eye gesture recognition devices that detect eye activity from users and transform the eye gestures as input into an input device, voice recognition sensing devices that enable users to interact with voice recognition systems through voice commands, medical imaging input devices, MIDI keyboards, digital musical instruments, and the like.

Output devices 530 may include one or more display subsystems, indicator lights, or non-visual displays such as audio output devices, etc. Display subsystems may include, for example, cathode ray tube (CRT) displays, flat-panel devices, such as those using a liquid crystal display (LCD) or plasma display, light-emitting diode (LED) displays, projection devices, touch screens, and the like. In general, use of the term "output device" is intended to include all possible types of devices and mechanisms for outputting information from computer system 500 to a user or other computer. For example, output devices 530 may include, without limitation, a variety of display devices that visually convey text, graphics and audio/video information such as monitors, printers, speakers, headphones, automotive navigation systems, plotters, voice output devices, and modems.

Computer system 500 may comprise one or more storage subsystems 510, comprising hardware and software components used for storing data and program instructions, such as system memory 518 and computer-readable storage media 516. The system memory 518 and/or computer-readable storage media 516 may store program instructions that are loadable and executable on processing units 504, as well as data generated during the execution of these programs.

Depending on the configuration and type of computer system 500, system memory 318 may be stored in volatile memory (such as random access memory (RAM) 512) and/or in non-volatile storage drives 514 (such as read-only memory (ROM), flash memory, etc.) The RAM 512 may contain data and/or program modules that are immediately accessible to and/or presently being operated and executed by processing units 504. In some implementations, system memory 518 may include multiple different types of memory, such as static random access memory (SRAM) or dynamic random access memory (DRAM). In some implementations, a basic input/output system (BIOS), containing the basic routines that help to transfer information between elements within computer system 500, such as during start-up, may typically be stored in the non-volatile storage drives 514. By way of example, and not limitation, system memory 518 may include application programs 520, such as client applications, Web browsers, mid-tier applications, server applications, etc., program data 522, and an operating system 524.

Storage subsystem 510 also may provide one or more tangible computer-readable storage media 516 for storing the basic programming and data constructs that provide the functionality of some embodiments. Software (programs, code modules, instructions) that when executed by a processor provide the functionality described herein may be stored in storage subsystem 510. These software modules or instructions may be executed by processing units 504. Storage subsystem 510 may also provide a repository for storing data used in accordance with the present invention.

Storage subsystem 300 may also include a computer-readable storage media reader that can further be connected to computer-readable storage media 516. Together and, optionally, in combination with system memory 518, computer-readable storage media 516 may comprehensively represent remote, local, fixed, and/or removable storage devices plus storage media for temporarily and/or more permanently containing, storing, transmitting, and retrieving computer-readable information.

Computer-readable storage media 516 containing program code, or portions of program code, may include any appropriate media known or used in the art, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media. This can also include nontangible computer-readable media, such as data signals, data transmissions, or any other medium which can be used to transmit the desired information and which can be accessed by computer system 500.

By way of example, computer-readable storage media 516 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 516 may include, but is not limited to, Zip® drives, flash memory cards, universal serial bus (USB) flash drives, secure digital (SD) cards, DVD disks, digital video tape, and the like. Computer-readable storage media 516 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 500.

Communications subsystem 532 may provide a communication interface from computer system 500 and external computing devices via one or more communication networks, including local area networks (LANs), wide area networks (WANs) (e.g., the Internet), and various wireless telecommunications networks. As illustrated in FIG. 5, the communications subsystem 532 may include, for example, one or more network interface controllers (NICs) 534, such as Ethernet cards, Asynchronous Transfer Mode NICs, Token Ring NICs, and the like, as well as one or more wireless communications interfaces 536, such as wireless network interface controllers (WNICs), wireless network adapters, and the like. As illustrated in FIG. 5, the communications subsystem 532 may include, for example, one or more location determining features 538 such as one or several navigation system features and/or receivers, and the like. Additionally and/or alternatively, the communications subsystem 532 may include one or more modems (telephone, satellite, cable, ISDN), synchronous or asynchronous digital subscriber line (DSL) units, FireWire® interfaces, USB® interfaces, and the like. Communications subsystem 536 also may include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components.

The various physical components of the communications subsystem 532 may be detachable components coupled to the computer system 500 via a computer network, a FireWire® bus, or the like, and/or may be physically integrated onto a motherboard of the computer system 500. Communications subsystem 532 also may be implemented in whole or in part by software.

In some embodiments, communications subsystem 532 may also receive input communication in the form of structured and/or unstructured data feeds, event streams, event updates, and the like, on behalf of one or more users who may use or access computer system 500. For example, communications subsystem 532 may be configured to receive data feeds in real-time from users of social networks and/or other communication services, web feeds such as Rich Site Summary (RSS) feeds, and/or real-time updates from one or more third party information sources (e.g., data aggregators 311). Additionally, communications subsystem 532 may be configured to receive data in the form of continuous data streams, which may include event streams of real-time events and/or event updates (e.g., sensor data applications, financial tickers, network performance measuring tools, clickstream analysis tools, automobile traffic monitoring, etc.). Communications subsystem 532 may output such structured and/or unstructured data feeds, event streams, event updates, and the like to one or more data stores 104 that may be in communication with one or more streaming data source computers coupled to computer system 500.

Due to the ever-changing nature of computers and networks, the description of computer system 500 depicted in the figure is intended only as a specific example. Many other configurations having more or fewer components than the system depicted in the figure are possible. For example, customized hardware might also be used and/or particular elements might be implemented in hardware, firmware, software, or a combination. Further, connection to other computing devices, such as network input/output devices, may be employed. Based on the disclosure and teachings provided herein, a person of ordinary skill in the art will appreciate other ways and/or methods to implement the various embodiments.

Figure 6:
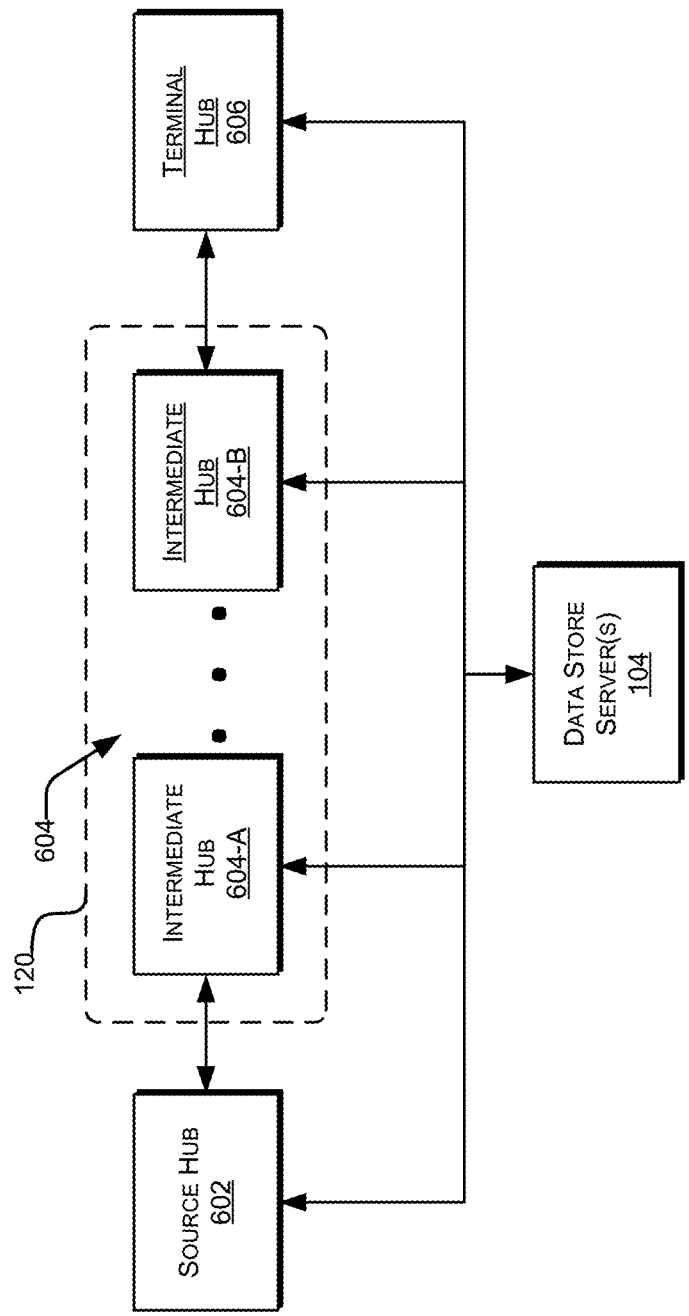
FIG. 6 is a block diagram illustrating one embodiment of the communication network.

With reference now to FIG. 6, a block diagram illustrating one embodiment of the communication network is shown. Specifically, FIG. 6 depicts one hardware configuration in which messages are exchanged between a source hub 602 via the communication network 120 that can include one or several intermediate hubs 604. In some embodiments, the source hub 602 can be any one or several components of the content distribution network generating and initiating the sending of a message, and the terminal hub 606 can be any one or several components of the content distribution network 100 receiving and not re-sending the message. In some embodiments, for example, the source hub 602 can be one or several of the user device 106, the supervisor device 110, and/or the server 102, and the terminal hub 606 can likewise be one or several of the user device 106, the supervisor device 110, and/or the server 102. In some embodiments, the intermediate hubs 604 can include any computing device that receives the message and resends the message to a next node.

As seen in FIG. 6, in some embodiments, each of the hubs 602, 604, 606 can be communicatively connected with the data store 104. In such an embodiments, some or all of the hubs 602, 604, 606 can send information to the data store 104 identifying a received message and/or any sent or resent message. This information can, in some embodiments, be used to determine the completeness of any sent and/or received messages and/or to verify the accuracy and completeness of any message received by the terminal hub 606.

In some embodiments, the communication network 120 can be formed by the intermediate hubs 604. In some embodiments, the communication network 120 can comprise a single intermediate hub 604, and in some embodiments, the communication network 120 can comprise a plurality of intermediate hubs. In one embodiment, for example, and as depicted in FIG. 6, the communication network 120 includes a first intermediate hub 604-A and a second intermediate hub 604-B.

Figure 7:
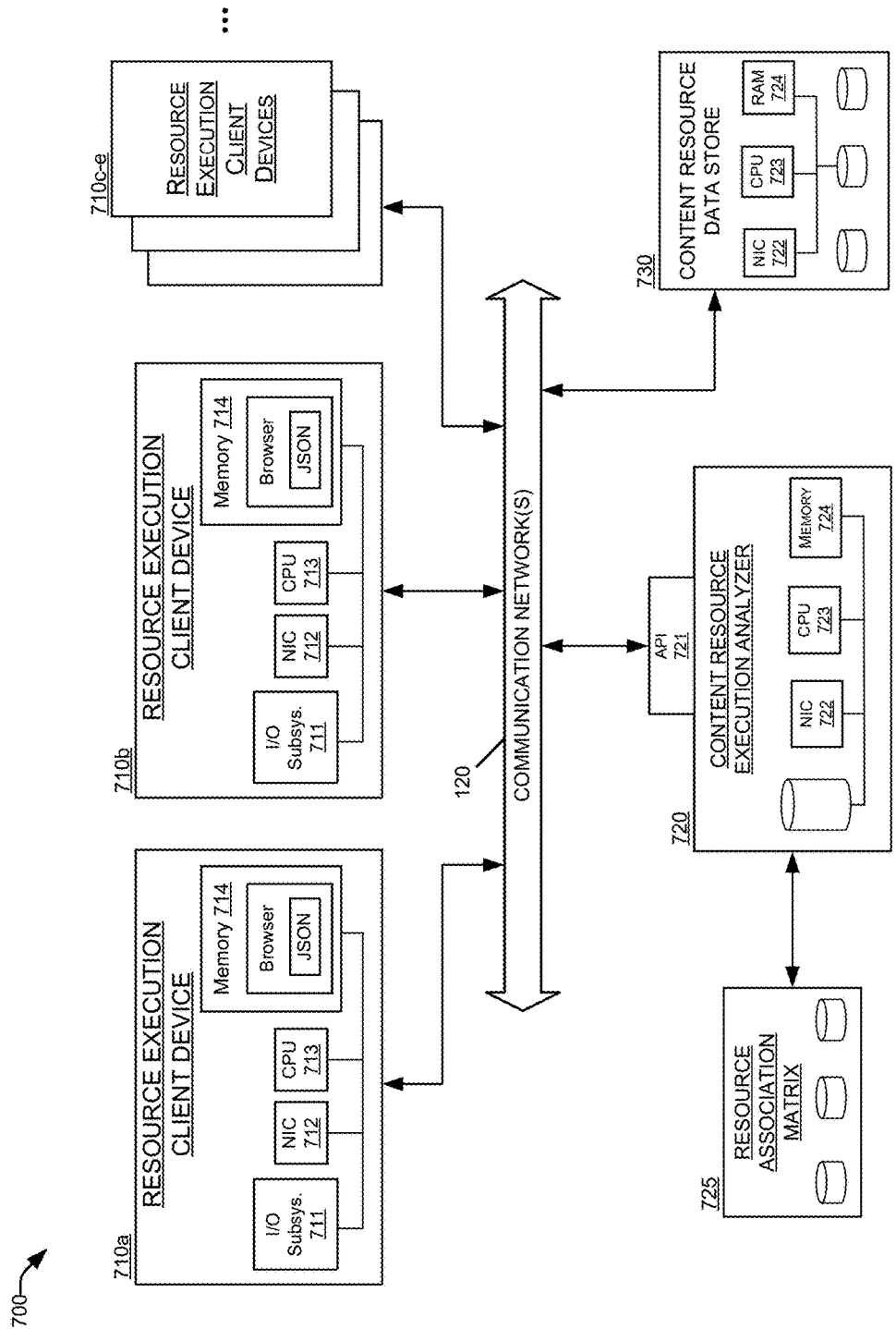
FIG. 7 is a block diagram illustrating an example analysis and selection system for interactive content resources, according to one or more embodiments of the disclosure.

With reference now to FIG. 7, a block diagram is shown illustrating an example of an analysis and selection system 700 for interactive content resources. As shown in this example, an analysis and selection system 700 may include one or more resource execution client devices (or execution client devices) 710 configured to communicate with a content resource execution analyzer 720. As discussed below, content resource execution analyzer 720 may be configured to analyze the execution of content resources within on various execution client devices 710, determine correlations between particular content executors, and select interactive content resources for execution on particular execution devices and/or particular content executors. Similarly, execution client devices 710 may operate in conjunction with one or more content resource execution analyzers 720 and/or content resource data stores 730 to receive and execute content resources locally, interact with content executors and/or end users during or after execution content resources, and transmit responses, feedback, and additional execution data back to the content resource execution analyzer 720. As discussed above, various types of interactive content resources may be analyzed, selected, and executed within the analysis and selection system 700 and other related systems described herein. For example, interactive content resources may include audio/video media resources, gaming software resources, eCommerce related resources, professional training and educational resources, assessments, etc.

In various embodiments, the content resources transmitted to an executed by execution client devices 710, as well as the content resources analyzed and selected by the content resource execution analyzer 720 for particular content executors may be assessment resources (or assessments). As used herein, assessments may refer to interactive software and/or media packages configured for execution on one or more client devices 710. In various examples, assessments may be used to perform medical or educational evaluations of particular individuals. For instance, an assessment may be requested and received at an execution client device 710 by an authorized content executor, such as a specialized clinician or educator. Specific assessments may be designed to be administered only by specifically qualified content executors, such as school psychologists, special needs educators, clinical psychiatrists, speech pathologists, and the like. Specific assessments also may be designed to be administered to specific recipients or end users, such as particular patients or students within a predetermined age range or developmental level, or particular end users having a predetermined diagnosed condition, etc.

As data objects, assessments may correspond to individual and standalone content resources, or may correspond to groups of related resources. For instance, an assessment may refer to a group of related interactive content resources, each of which is a component or subtest of the assessment. In some cases, an assessment consisting of multiple components may be provided to an execution client device 710 as a single content resource, while in other cases client devices 710 may request/receive individual components of an assessment as separate content resources rather than requesting/receiving the entire assessment. Additionally, particular content executors (e.g., clinicians, therapists, etc.) may have licenses and/or subscriptions for individual assessments (each of which having one or more components) and/or for groups or packages of related assessments. As discussed below, the selections and recommendations of particular assessments (and/or particular components within assessments) provided to content executors may be based in part on whether the selected assessments are covered by the existing licenses or subscriptions of the content executor.

Further, assessments and/or individual components within assessments have may various execution restrictions and requirements based on the execution client device, the content executor, and/or the end user receiving the assessment or component. For examples, certain assessments may have particular hardware and/or network requirements, and thus may be prevented from being selected for (e.g., by the content resource execution analyzer 720) and/or executed on any execution client device 710 not having the required hardware. Similarly, for network requirements, the content resource execution analyzer 720 may prevent an assessment from being selected for and/or transmitted to an execution client device 710 during times when the current network conditions (e.g., current bandwidth, congestion levels, etc.) do not satisfy the network requirements, or when the current connection of the execution client device 710 to its access network (e.g., an LTE network or a 2G, 3G, or 5G, etc. wireless network) does not satisfy the network requirements associated with the assessment.

Additional requirements associated with an assessment may relate to the content executor, for example, the content resource execution analyzer 720 may prevent a particular assessment from being selected for, transmitted to, or executed on a client device 710 unless the content executor (e.g., clinician, medial professional, educator, etc.) initiating and operating the assessment has the required authorization level. Such authorization levels may correspond to the access permissions of a particular content executor (e.g., determined based on their login credentials) on any of the servers or devices in the system 700. The authorization level of the content executor also may correspond to the professional qualifications of the content executor, such as professional credentials, degrees, certifications, and/or licenses of the particular clinician, educator, etc. Thus, certain assessments may be authorized to be selected for, transmitted to, and/or executed on client devices 710 by content executors have certain access permissions within the system 700 and/or having certain professional qualifications, while the same assessments may be restricted from other content executors not having the required access permissions and/or professional qualifications. Other types of assessment restrictions may be based on characteristics of the end user (e.g., patient or student) that will take the assessment, such as patients or students within a predetermined age range or developmental level, or particular end users having a predetermined diagnosed condition, etc.

Additionally or alternatively, the assessment requirements for content executors may be based on the organization of the content executor. That is, certain assessments may be authorized to be selected for, transmitted to, and/or executed by content executors associated with certain organizations but not others. Additional assessment requirements for content executors may be location based, so that only content executors currently within a particular geographic jurisdiction (e.g., one or more specific countries, states, counties, etc.), or at particular locations (e.g., specific hospitals, schools, medical offices, etc.), may be authorized for certain assessments. Further examples of the assessment requirements may include limitations on the number and/or frequency of executions of an assessment by a particular content executor, and restrictions on the times and days that an assessment may be executed by a particular content executor.

Any of the above requirements associated with an assessment (and/or with an individual components within assessments) may be implemented within and enforced by the analysis and selection system 700 using various techniques. As discussed below system 700 may be an implementation of a content distribution network 100 in which execution client devices 710 are able to request, receive, and execute interactive content resources from one or more content data stores 730. Thus, any of the various types of assessment restrictions discussed above may be enforced by execution client devices 710 and/or content data stores 730 whenever a content executor attempts to download and/or initiate execution of an assessment on a client device 710. Additionally, as discussed below, the content resource execution analyzer 720 may be configured to analyze correlations between content executors, and to select and recommend interactive content resources for particular content executors based on analysis. Therefore, the any of the various types of assessment restrictions discussed above may be enforced by the execution analyzer 720, by selecting (or not selecting) interactive content resources for a particular content executor based on determinations that the content executor, the execution client device, or the end user is (or is not) authorized for the interactive content resources, etc. In such embodiments, the execution analyzer 720 may filter the interactive content resources selected for and/or output to the content executor, to include only those interactive content resources that are authorized for execution by the content executor (and/or the executor's organization), on the client device 710, to the end user, at the current time and execution location, etc.

In some embodiments, the analysis and selection system 700 for interactive content resources may be integrated within, or configured to operate in collaboration with, one or more content distribution networks 100. For example, system 700 may be the same as, or may operate within or in collaboration with, any of the content distribution network (CDNs) 100 described above. Thus, specific examples of resource analysis and selection systems 700 may include, without limitation, educational and professional training systems and networks, interactive gaming systems and networks, clinical/educational assessment distribution systems and networks, and enterprise application systems and networks, websites and other Internet-based systems and networks. Accordingly, in the various different resource analysis and selection systems 700, content resources may correspond to assessments and/or assessment components or packages, while in other systems 700 the resources may correspond to educational/training resources (e.g., in educational and professional training CDNs 100), evaluation or survey resources (e.g., in enterprise applications or online Internet-based CDNs 100), or product/media resources (e.g., in interactive gaming or media distribution CDNs 100), etc.

In some cases, the execution analyzer 720 may be implemented within one or more content management servers 102 and/or other CDN servers, the content resource data store(s) 730 may correspond to one or more content servers 112 and/or data store servers 104, and execution client devices 710 may correspond to the user devices 106 and 110 described above in reference to CDN 100. Thus, within the resource analysis and selection systems 700 (which may also be referred to as CDN 700 when describing certain embodiments), client devices 710 may interact with the content resource execution analyzer 720 to upload content execution data and receive selections and/or recommendations of additional content resources to be executed. As discussed below, the execution analyzer 720 may maintain one or more matrix data structures 725 storing content resource execution data and/or association data between resources and content executors. Additionally, client devices 710 may interact with content resource data stores 730 to request/receive particular interactive content resources (e.g., assessments) based on the selections determined by the content resource execution analyzer 720. Although the content resource execution analyzer 720, association matrix 725, and content resource data store 730 are shown as separate components in this example, in other embodiments they be implemented within the same servers and/or same data centers. In other examples, a content resource execution analyzer 720 may be implemented using one or more computer servers, and other specialized hardware and software components, separately from any other CDN components such as content servers 112, content management servers 102, data store servers 104, and the like. In these examples, the content resource execution analyzer 720 may be configured to communicate directly with client devices 710, or indirectly through content management servers 102 and/or other components and communications networks of the CDN 700.

In order to perform these features and other functionality described herein, each of the components and sub-components discussed in the example analysis and selection system 700 for interactive content resources may correspond to a single computer server or a complex computing system including a combination of computing devices, storage devices, network components, etc. Each of these components and their respective subcomponents may be implemented in hardware, software, or a combination thereof. Certain execution client devices 710 may communicate directly with the content resource execution analyzer 720, while other client devices 710 may communicate with the content resource execution analyzer 720 indirectly via one or more intermediary network components (e.g., routers, gateways, firewalls, etc.) or other devices (e.g., content management servers 102, content servers 112, etc.). Although the physical network components have not been shown in this example so as not to obscure the other elements depicted in the figure, it should be understood that any of the network hardware components and network architecture designs may be implemented in various embodiments to support communication between the servers and devices in the system 700. Additionally, different client devices 710 may use different networks and networks types to communicate with the content resource execution analyzer 720, including one or more telecommunications networks, cable networks, satellite networks, cellular networks and other wireless networks, and computer-based IP networks, and the like. Further, certain components within system 700 may include special purpose hardware devices and /or special purpose software, such as those included in I/O subsystems 711 and client application memory 714 of the client devices 710, as well as those within the API 721 and processing engines within the memory 724 of the content resource execution analyzer 720, discussed below.

Although the functionality of system 700 may be described below in terms of a client-server model, it should be understood that other computing environments and various combinations of servers and devices may be used to perform the functionality described herein in other examples. For instance, although the analysis of content resource executions on client devices 710, the determinations of correlations between content executors, and the selections of content resources for particular content executors, may be performed by a web-based server (e.g., execution analyzer 720) in collaboration with a client application (e.g., web browser or standalone client application) executing on client devices 710, in other cases these techniques may be performed entirely by a specialized content resource execution analyzer 720, or entirely by software executing on a client device 710. In other examples, a client-server model may be used as shown in system 700, but different functional components and processing tasks may be allocated to the client-side or the sever-side in different embodiments. Additionally, the content resource data store 730 and resource association matrix 725 may be implemented as separate servers or storage systems in some cases, and may use independent hardware and software service components.

Execution client devices 710 may include desktop or laptop computers, smartphones, tablet computers, and other various types of computing devices, each of which may include some or all of the hardware, software, and networking components discussed above. Specifically, a client device 710 may be any computing device with sufficient processing components, memory and software components, and I/O system components for interacting with users (e.g., content executors and end users), and with the content resource execution analyzer 720 and content resource data stores 730 to select and receive assessments (or other resources) for execution. Accordingly, client devices 710 may include the necessary hardware and software components to establish the network interfaces, security and authentication capabilities, and capabilities for assessment resource storage, validation, and execution. In this example, client devices 710 may each include an I/O subsystem 711, network interface controller 712, a processing unit 713, a memory 714 configured to operate client software applications. Client device 710 may be configured to receive and execute various programmatic and graphical interfaces to define, construct, validate, and store assessment resources having various types of assessment components and functionality. Accordingly, each I/O subsystem 711 may include hardware and software components to support a specific set of output capabilities (e.g., LCD display screen characteristics, screen size, color display, video driver, speakers, audio driver, graphics processor and drivers, etc.), and a specific set of input capabilities (e.g., keyboard, mouse, touchscreen, voice control, cameras, facial recognition, gesture recognition, etc.). Different client devices 710 may support different input and output capabilities within their I/O subsystems 711, and thus different types of interactions with assessments/components may be compatible or incompatible with certain client devices 710. For example, certain interactive assessments (or other types of content resources) may require specific types of processors, graphics components, network components, or I/O components in order to be optimally designed and constructed using a client device 710. In some embodiments, users may establish user-specific preferences for executing specific types of assessments or other resources on specific types of client devices 710. Additionally, as shown in this example, the memory 714 of client devices 710 may include web browser software having browser-native support for JavaScript Object Notation (JSON). JSON data objects may be generated and stored within the browser memory, and used to implement the user interactions and feedback logic for assessments and/or other types of interactive content resources.

In some embodiments, the content resource execution analyzer 720 may generate and provide the software interfaces (e.g., via API 721, a web-based application or other programmatic or graphical interface techniques) used by the execution client devices 710 to receive content resource execution data and provide selections of content resource to client devices 710. In response to receiving and validating login credentials from a client device 710, or at predetermined times before logins are received, the content resource execution analyzer 720 may access the resource association matrix 725 to retrieve and analyze execution data, and determine selections for the content executor operating the client device 710. In other to perform the tasks described herein, content resource execution analyzers 720 and/or content resource data stores 730 may include components such as network interface controllers 722, processing units 723, and memory 724 configured to store server software, handle authentication and security, and store/retrieve assessments and other content resources from data stores 730, etc. The content resource execution analyzers 720 and content resource data stores 730 may be implemented as separate software (and/or storage) components within a single computer server in some examples, while in other examples may be implemented as separate computer servers/systems having separate dedicated processing units, storage devices, and/or network components.

Figure 8:
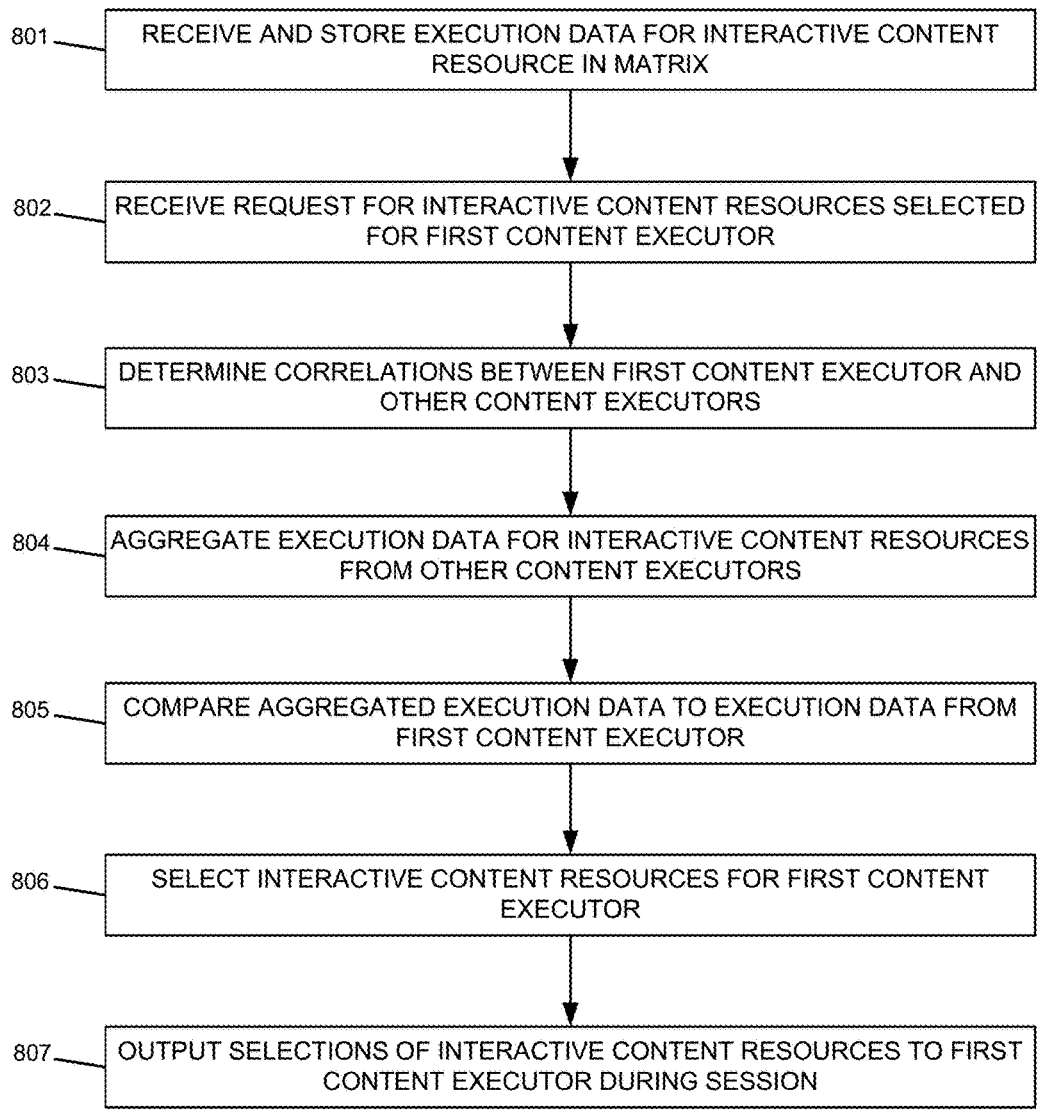
FIG. 8 is a flow diagram illustrating an example process of selecting interactive content resources for a particular content executor, according to one or more embodiments of the disclosure.

Referring now to FIG. 8, a flow diagram is shown illustrating a process of selecting interactive content resources for a particular content executor. As described below, the steps in this process may be performed by one or more components in the analysis and selection system 700 for interactive content resources described above. For example, each of the steps 801-807 may be performed by a content resource execution analyzer 720, as described below. However, in other examples, one or more of steps 801-807 may be performed in conjunction with execution client devices 710, an association matrix server 725, and a content resource data store 730. It should also be understood that the various features and processes described herein, including receiving and analyzing content resource execution data, determining correlations between content executors, and selecting or recommending interactive content resources for particular content executors, need not be limited to the specific systems and hardware implementations described above in FIGS. 1-7.

In step 801, the content resource execution analyzer 720 may receive data from one or more client devices 710 indicating occurrences of content resources being executed on those client devices 710. Such data describing the execution of content resources on execution client devices 710 may be referred to herein as content resource execution data. In some cases, the data in step 801 may be received directly from client devices 710, while in other cases the data may be received from other sources, such as the content resource data store 730 and/or other intermediary devices within the content distribution system 700.

The content resource execution data received in step 801 may indicate the particular content resource(s) that have been executed, and the particular context executor that initiated the execution of the content resource(s). As discussed above, in some embodiments, the executed content resource(s) may correspond to particular assessments, components within assessments, and/or packages or groups of assessments, and the content executor may correspond to a specific authorized user, such as a specialized clinician or educator that is authorized and qualified to provide the assessment to an end user (e.g., a patient, a student, etc.). Of course, in other embodiments, the content resource execution data received in step 801 may correspond to any of the other types of content resources discussed herein.

In addition to identifying the content resources and context executors, the content resource execution data received in step 801 may various other information, for example, the current status of the execution (e.g., completed, partially completed, not completed, in-progress, etc.), data identifying the end user that interacted with the content resources, any responses/feedback received from the end user and/or the context executor, the times and/or locations at which the content resource was executed, and information describing the execution client device(s) 710 on which the content resource was executed (e.g., client device identifiers, software and hardware capabilities, network details, etc.). The data received in step 801 may be stored in the resource association matrix 725, which may be structured as one or more user-resource matrix data structures for each content resource and/or for each content executor.

Figure 9:
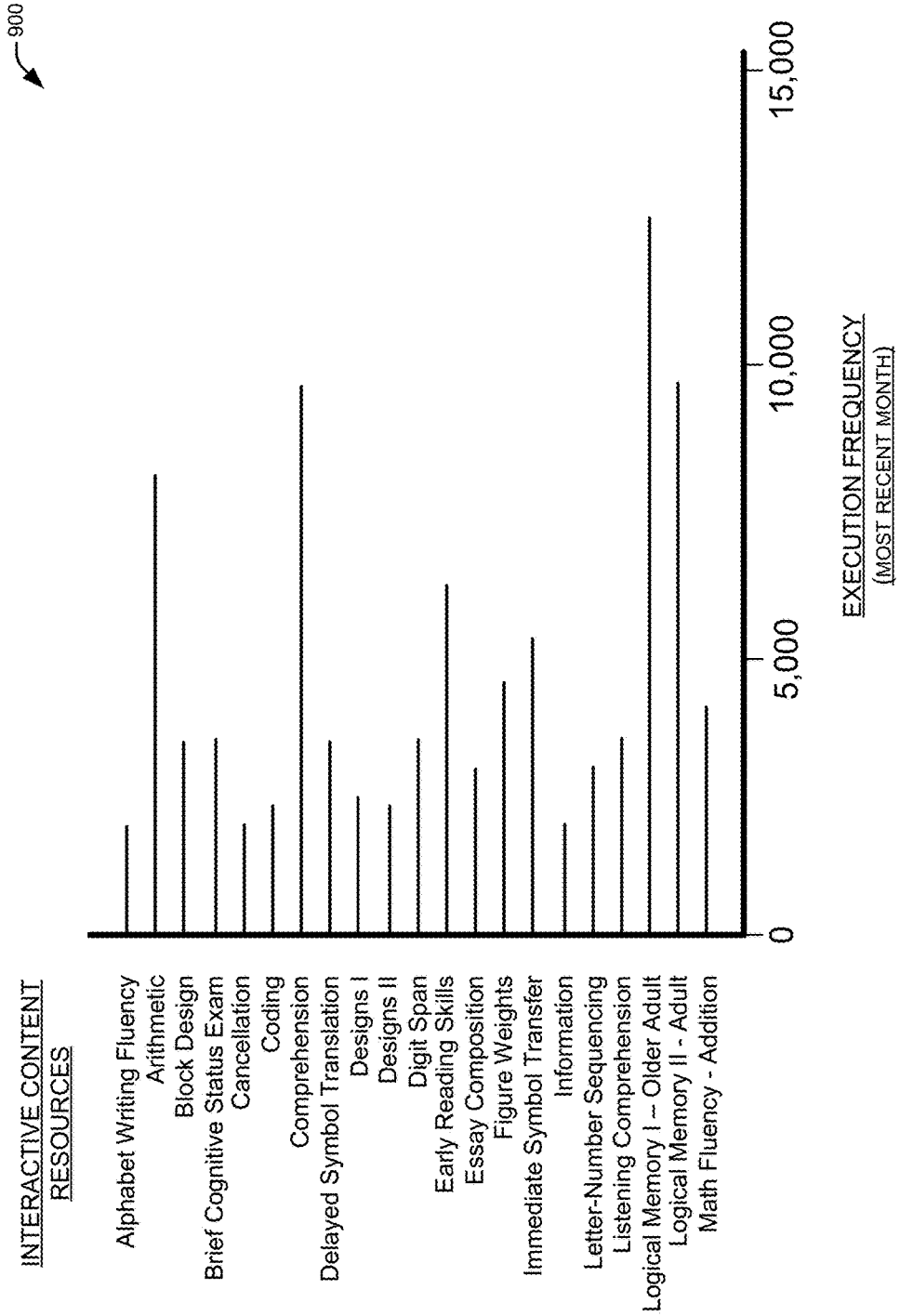
FIG. 9 is an example graph including frequency data for execution of illustrative interactive content resources, according to one or more embodiments of the disclosure.

Referring briefly to FIG. 9, a graph 900 is shown including frequency data for execution of particular interactive content resources. In this example, the total number of executions of the content resources over the last month is represented along the x-axis, without regard to the content executors, client devices 710, times, locations, feedback, or any other execution data. However, in other examples, the resource association matrix 725 and/or other data structures/data stores may store similar content resource execution data for each individual content executor, each individual client device 710, etc.

Returning to FIG. 8, in step 802, the content resource execution analyzer 720 may receive a request for selections of one or more interactive content resources for a particular content executor. That is, the request in step 802 may be a request by or on behalf of a particular first content executor (e.g., a clinician, educator, medical professional, etc.) for selections/recommendations of other interactive content resources that the content executor might also be interested in initiating and providing to their end users (e.g., patients, students, etc.). In some cases, the request may be initiated automatically by the system software in response to a authenticated login, the execution of another content resource, or other actions taken by the content executor within the system 700. In other cases, the client software executing on the content executor's client device 710 might invoke a user interface that allows the content executor to expressly request selections/recommendations of resources in step 802. In other cases, the content resource execution analyzer 720 may periodically initiate requests for different content executors in batches, so that the subsequent analyses and processing load can be managed and/or performed during periods of relatively low system usage.

A request in step 802 for selections of interactive content resources for a content executor may identify the content executor only, or may identify the content executor and certain other variables that may be used in the analysis and selection processes. Such other variables may include the current client device 710 of the content executor, the end user(s) for whom the content executor is currently providing and administering content resources, the current location (e.g., geographic jurisdiction and/or specific organization buildings/facilities) of the content executor, etc. As discussed below, some of all of these additional data may be taken into account by the content resource execution analyzer 720 when selecting resources for the content executor.

In step 803, the content resource execution analyzer 720 may determine correlation(s) between the content executor identified in the request of step 802, and one or more additional content executors, based on the content resource execution data stored in the association matrix 725. Thus, for a particular content executor, the determination in step 803 may include performing various statistical analyses on the association matrix 725 in order to identify additional content executor(s) having similar behavior patterns with respect to executing content resources.

Figure 10:
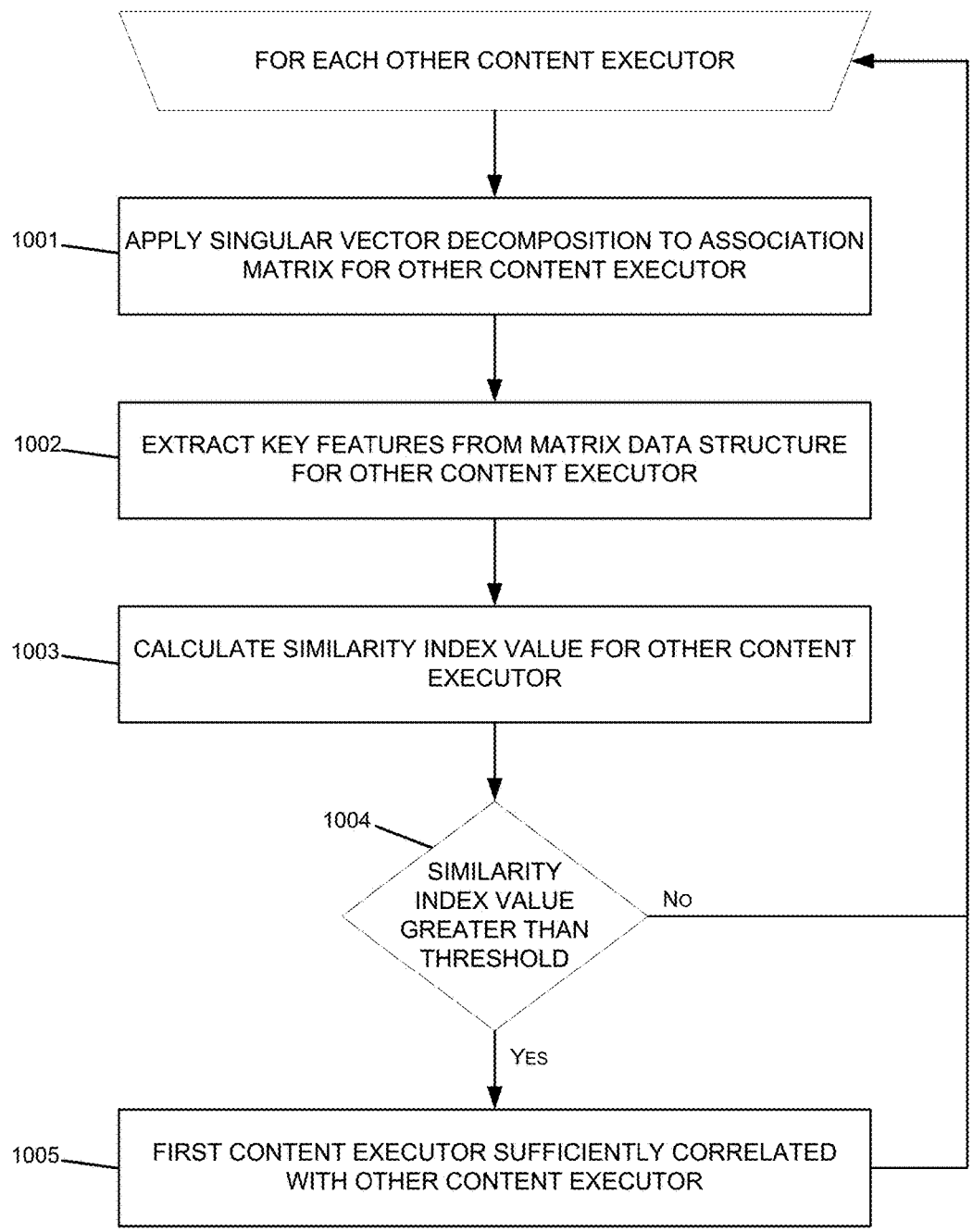
FIG. 10 is a flow diagram illustrating an example process of determining correlations between content executors based on a matrix of content resource execution data, according to one or more embodiments of the disclosure.

FIG. 10 shows an example of the statistical analysis that may be performed by the content resource execution analyzer 720 to determine correlations in step 803. As shown in this example, the steps in FIG. 10 may be performed iteratively (or in parallel) for all other content executors having data records within the matrix 725 of executing content resources. In step 1001, for each of the other content executors in the system 700, the execution analyzer 720 may apply singular vector decomposition to the resource association matrix 725 for the other content executor. In step 1002, the execution analyzer 720 then may extract the key features from the association matrix 725 for the other content executor, and in step 1003 may calculate a similarity index value for the other content executor. The similarity index value may be, for example, a numeric value from 0.00 (indicating no behavioral correlation) and 1.00 (indicating perfect behavioral correlation) between the other content executor and the first content executor identified in initial request in step 802. After determining the similarity index value for the other users, the execution analyzer 720 may compare each of the similarity index values to a similarity threshold in step 1004. The other content executors not having a sufficiently high similarity index value (1004:No) are not saved as correlations to the first content executor, while any other content executors having similarity index values greater than the threshold (1004:Yes) are determined to be sufficiently correlated with the first content executor, and may be output/saved as correlations in step 1005.

In some cases, the statistical analysis of step 803 (e.g., steps 1001-1005) to determine correlations between content executors, may be based only on the data from matrix 725 indicating which interactive content resources have been executed by which content executors. Thus, two different content executors who have initiated and executed the same resources the same number of times, would be perfectly correlated. However, in other cases, the statistical analysis of step 803 (e.g., steps 1001-1005) may take into account execution order and/or groups or sequences of execution, and other execution patterns as well. For example, in embodiments relating to execution of assessments (and/or components of assessments), the correlation analyses may take into account the order of assessment execution (e.g., a content executor initiates/executes assessment ABC followed by assessment DEF for a particular end user), patterns of assessment execution (e.g., a content executor typically executes assessment component 4 followed by component 6, and then component 1), and/or groups of assessment execution (e.g., a content executor repeatedly executes a group three assessments when assessing end users), etc.

Figure 11:
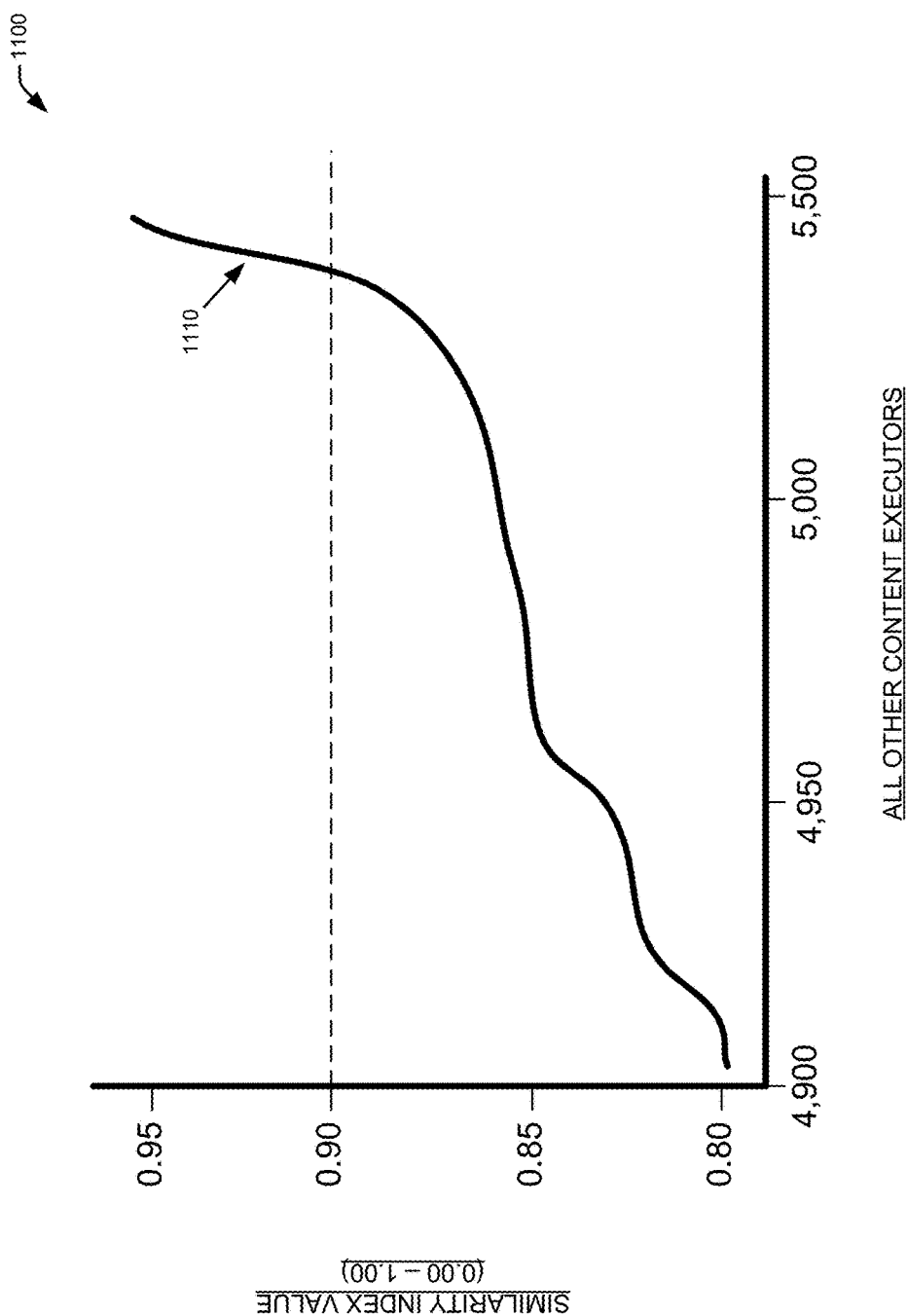
FIG. 11 is an example graph including calculated similarly index values for a plurality of content executors with respect to a first content executor, according to one or more embodiments of the disclosure.

Referring briefly to FIG. 11, an example graph 1100 is shown charting the similarly index values of a plurality of content executors with respect to a first content executor. In this example, the results of similarly index values have been sorted from lowest to highest, so that the right portion of the chart represents the content executors that correlate most closely to the first content executor. In this example, a similarity threshold of 0.90 is illustrated, meaning that the execution analyzer 720 may select in step 1004 any content executors having a similarity threshold of greater than 0.90, label here as group 1110, as those content executors that sufficiently correlate with the first content executor.

In other examples, rather than using a particular similarity threshold, the content resource execution analyzer 720 may calculate the similarly index values for all other content executors, and then may select the N highest values (e.g., 5 highest, 10 highest, 100 highest, etc.), corresponding to the N most similar context executors to the first content executor.

As in the examples above, the determination of correlating content executors in step 803 may be limited to analyses of the content resources executed the various content executors (e.g., including groups, patterns, sequences of executions, etc.). However, in other embodiments, the determination of correlating content executors for a first content executors in step 803 may include weighting and/or filtering the results based on factors such as content executor authorization credentials, location, jurisdiction, and other properties of specific content executors. For instance, after determining a number of similar content executors for a first content executor (e.g., based on a similarity threshold in step 1004), the results may be further filtered so that only other content executors within the same jurisdiction (e.g., the same country, state, county, etc.) as the first content executor are included as correlated content executors. Similarly, the results may be filtered so that only other content executors within the same organization or entity (e.g., a medical practice, university, corporation, etc.) are included as correlated content executors. In other examples, filters may be applied so that only other content executors having the same or similar authorization levels, such as the same or similar access permissions within the system 700, or the same or similar professional credentials (e.g., degrees, licenses, certifications, etc.) to administer assessments to end users, are included as correlated content executors. For any of these examples, weighting may be used instead of or in addition to filtering, so that content executors within the same locations, same organizations, and/or having the same authorization levels may have their probabilities increased through weighting of being selected as a correlated content executor.

In step 804, after determining one or more content executors correlated to the first content executor, the content resource execution analyzer 720 may aggregate the execution data for the correlated content executors from the resource association matrix 725. For example, if a group 1110 of content executors having a high similarity index with respect to the first content executor is determined in step 803, then the execution analyzer 720 may retrieve and aggregate all of the content resource execution data for each of group 1110 in step 804. In some embodiments, the data aggregation in step 804 may correspond to a simple aggregation of the number of times that each interactive content resource was executed by any of the correlating group 1110. Such data aggregation may be represented by graphs similar to example graph 900 in FIG. 9, in which a single metric (number of executions) is generated for each interactive content resource. In other examples, rather than simply counting the total numbers of executions, the data may be aggregated to also identify execution patterns, execution groups, and/or execution sequences, which may be represented by more complex data structures and aggregation logic. Additionally, the data aggregation may be broken down further by execution time, execution location, client device characteristics, end user characteristics, and other execution variables, so that multiple metrics/multiple charts may be generated for each interactive content resource during the data aggregation of step 804.

In step 805, the content resource execution analyzer 720 may compare the aggregated execution data for the correlated content executors, to the execution data from the first content executor. The comparison in step 805 may identify one or more interactive content resources that are frequently executed by the correlated content executors, but have not been executed (or are under-executed) by the first content executor. For example, if the data aggregation in step 804 includes a list of execution frequency data for different content resources (e.g., such as graph 900), then the comparison in step 805 may begin with the most frequently executed content resources from the aggregated execution data, accessing the association matrix 725 to determine whether or not (and/or how often) the first content executor has executed each of the most frequently executed content resources from the aggregated list. Thus, the comparison in step 805 may yield a number of interactive content resources that are frequently executed by correlated content executors, but have not been executed (or have been infrequently executed) by the first content executor.

In step 806, the content resource execution analyzer 720 may select one or more interactive content resources for the first content executor. As discussed above, the resources selected for the first content executor may correspond to recommendations of particular interactive content resources (e.g., assessments or components thereof) that the content executor might be interested in providing to their end users. In some cases, the resources selected in step 806 may be provided as optional recommendations to the first content executor, while in other cases the selected resources need not be recommendations but may be required resources or resources that are automatically selected for execution on the client device 710 of the first content executor during the next execution session.

In some embodiments, the resources selected for the first content executor in step 806 may be based on the comparison the first content executor's resource execution data to the aggregated execution data of the correlated content executors in step 805. For example, the execution analyzer 720 may select the N number of interactive content resources that are most frequently executed by correlated content executors, but have not been executed (or have been infrequently executed) by the first content executor, and identify those N interactive content resources as the selections in step 806. However, in other embodiments, the selection in step 806 may be based on additional factors and/or may include additional filtering/weighting of possible selections of content resources.

Figure 12:
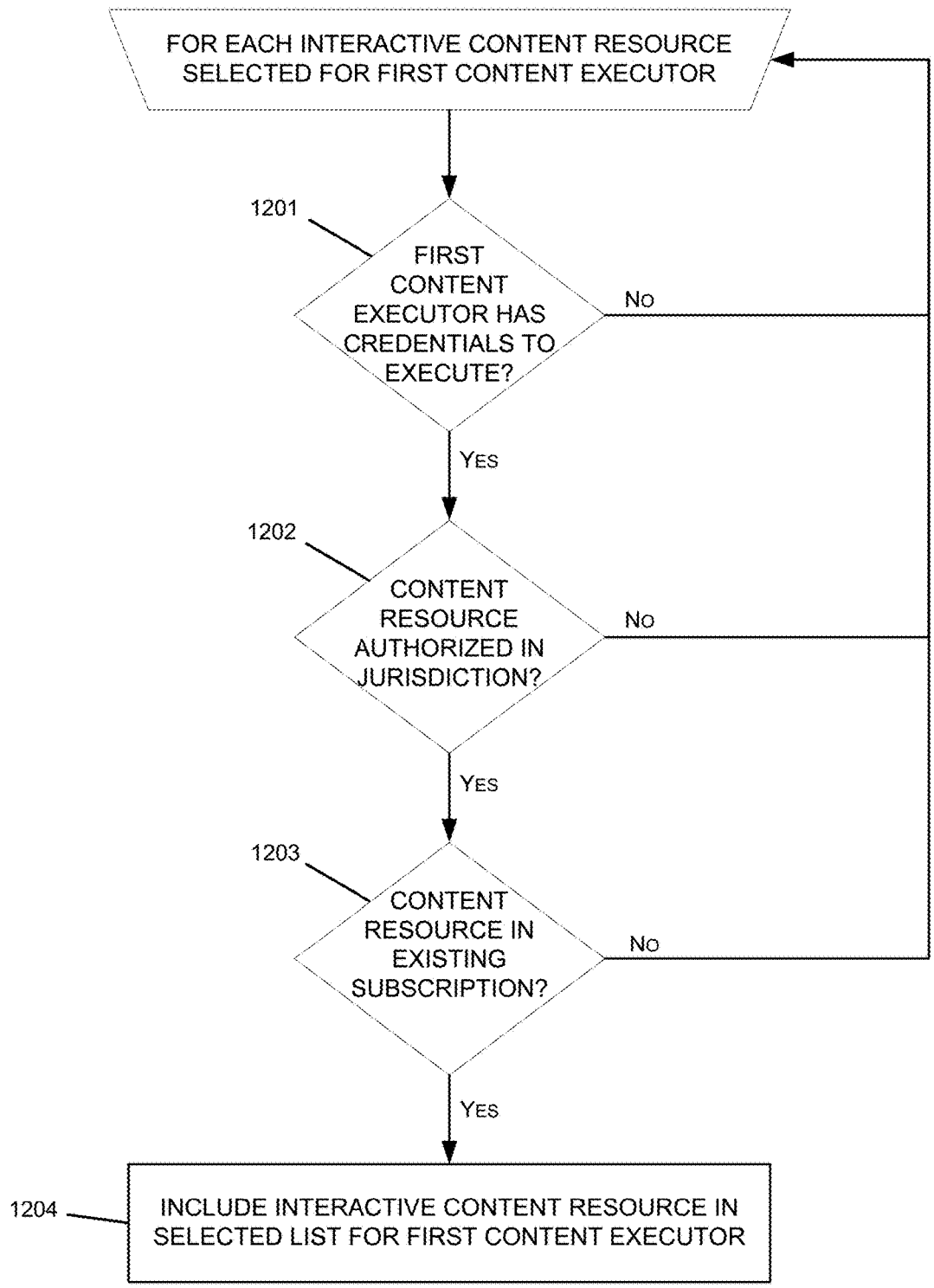
FIG. 12 is a flow diagram illustrating an example process of filtering selections of interactive content resources for a particular content executor, according to one or more embodiments of the disclosure.

For example, referring briefly FIG. 12, a flow diagram is shown illustrating an example algorithm for filtering the selections of interactive content resources for the first content executor in step 806. In this example, the algorithm may be performed iteratively for the content resources most frequently executed by the correlated content executors (see step 804) (e.g., from most to least frequently executed), and/or that have not been previously (or frequently) executed by the first content executor (see step 805). In step 1201, the execution analyzer 720 may determine whether or not the first content executor has sufficient authorization credentials to execute the selected interactive content resource. As noted above, in some cases the authorization credentials of a content executor may refer to their security level/access permissions with the servers and devices of the system 700 and/to the security level/access permissions of their particular organization with respect to the different content resources in the data store 730. Additionally or alternatively, the content executor's authorization credentials may refer to the professional credentials (e.g., certifications, licenses, degrees, etc.) of each content executor, as certain content executor might not have the required credentials to administer resources such as interactive assessments to students or patients. In these examples, if the first content executor does not have sufficient authorization credentials to execute the particular interactive content resource (1201:No), then the resource may be excluded from the list of resources selected for the first content executor.

In step 1202, the execution analyzer 720 may determine whether or not the selected interactive content resource is authorized for execution at the current location (e.g., region or jurisdiction) of the first content executor. For some types of interactive content resources, such as assessments/components administered by content executors (e.g., clinicians, educators, etc.) to end users (e.g., students or patients), certain assessments might not be accepted, accredited, or valid in all jurisdictions. For instance, a particular assessment may be approved in some states or countries but not others, or accepted before some governing body, medical boards, legal systems, etc., and not others. Thus, the determination in step 720 may be used to exclude any selected interactive content resources that may be invalid or not authorized at the context executor's current location (1202: No). In some cases, the determination of step 1202 may be performed at execution-time, based on the current location of the first content executor at that time. The current location may be determined, for example, based on the IP address or access network of the client device 710 (detected during or after the login), or based on manual input from the content executor. Thus, the selections made for the first content executor may be different depending on the jurisdiction or other location from which the first content executor logs in. In other examples, the determination of step 1202 may be performed based on a permanent location associated with the first content executor, e.g., a registered or home office location or authorized jurisdiction, rather than based on the particular location of the first content executor at that time.

In step 1203, the execution analyzer 720 may determine whether or not the selected interactive content resource is within a content resource subscription (or package or license) that is already available to the first content executor. This determination might not be applicable in all embodiments, but may be relevant, for example, in embodiments wherein interactive content resources such as assessments are made accessible to content executors (e.g., clinicians, therapists, etc.) in groups via licenses or subscriptions. In some such cases, when a license or subscription has been obtained, then no additional execution fees are required for any executing content resources within the group. In other cases, even if execution fees are applied, there may be other advantages to executing content resources within the group over those resources outside of the group (e.g., ease of access, pre-approval by jurisdiction or organization, etc.), and thus the determination in step 1203 may be performed in such cases. When the determination in step 1203 is performed, if the selected content resource is not part of an existing group (e.g., license or subscription) of resources currently available to the first content executor (1203:No), then the resource may be excluded from the list of resources selected for the first content executor.

In step 1204, any of the selected content resources that have not been excluded by the earlier filters 1201-1203 may be included in the list of selected resources for the first content executor. Although three tests/filters 1201-1203 were described in this example, it should be understood that any sub-combination or none of these filters may be used in various embodiments. Additionally, for any of these examples, weighting may be used instead of or in addition to filtering, so that selected content resources might be weighted up or down based on the authorization credentials of the first content executor with respect to the content resources, the location of first content executor, and/or whether selected content resource is not part of an existing group of resources available to the first content executor. Additionally, different filters or weightings may be implemented based on other factors, such as the compatibility of selected content resources with the hardware and software resources of the execution client device 710, and the current network conditions of the content executor's current network session. Additional filters may be based on the characteristics of the end user (e.g., patient or student) for whom the content resources are being selected.

In still other implementations of step 806, the content resources selected for a particular user also may be based on the current context of the content executor's resource execution session. For example, if the first content executor has recently executed one particular assessment resource, then the selections of content resources in step 806 may be affected by the recently execution of the particular assessment resource. For instance, assessments that are related and/or occurring in patterns or sequences with the recently executed assessment may be weighted or prioritized when selecting additional assessments in step 806.

In step 807, the content resource execution analyzer 720 may output the selections of interactive content resources to the first content executor. The outputting of content resource selections to the first content executor in step 807 may be performed at various different times and using various different techniques. For example, for execution of assessment resources, where the first content executor may be a clinician or educator, the execution analyzer 720 may provide the selections as a list of assessment recommendations in response to the content executor logging in to the system 700 and/or initiating a resource execution session. Referring briefly to FIG. 13, an example user interface is shown in which a selected battery of assessments is output for a particular clinician. In other examples, outputting of content resource selections to the first content executor in step 807 need not be performed when the first content executor is logged into the system 700. For instance, notifications may be generated and transmitted to the first content executor via email, a client application alert, SMS or other mobile alerts, etc.

A limited number of embodiments of the present invention have been described, but the invention contemplates many more that are enabled by the description. For example, the concepts of the invention are applicable to performing analyses and selections of assessments as well as any other types of interactive content resources, including media resources, professional training and educational resources, interactive gaming resources, interactive eCommerce resources, etc. A number of variations and modifications of the disclosed embodiments can also be used. Specific details are given in the above description to provide a thorough understanding of the embodiments. However, it is understood that the embodiments may be practiced without these specific details. For example, well-known circuits, processes, algorithms, structures, and techniques may be shown without unnecessary detail in order to avoid obscuring the embodiments.

Implementation of the techniques, blocks, steps and means described above may be done in various ways. For example, these techniques, blocks, steps and means may be implemented in hardware, software, or a combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described above, and/or a combination thereof.

Also, it is noted that the embodiments may be described as a process which is depicted as a flowchart, a flow diagram, a swim diagram, a data flow diagram, a structure diagram, or a block diagram. Although a depiction may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, scripting languages, firmware, middleware, microcode, hardware description languages, and/or any combination thereof. When implemented in software, firmware, middleware, scripting language, and/or microcode, the program code or code segments to perform the necessary tasks may be stored in a machine readable medium such as a storage medium. A code segment or machine-executable instruction may represent a procedure, a function, a subprogram, a program, a routine, a subroutine, a module, a software package, a script, a class, or any combination of instructions, data structures, and/or program statements. A code segment may be coupled to another code segment or a hardware circuit by passing and/or receiving information, data, arguments, parameters, and/or memory contents. Information, arguments, parameters, data, etc. may be passed, forwarded, or transmitted via any suitable means including memory sharing, message passing, token passing, network transmission, etc.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in a memory. Memory may be implemented within the processor or external to the processor. As used herein the term "memory" refers to any type of long term, short term, volatile, nonvolatile, or other storage medium and is not to be limited to any particular type of memory or number of memories, or type of media upon which memory is stored.

Moreover, as disclosed herein, the term "storage medium" may represent one or more memories for storing data, including read only memory (ROM), random access memory (RAM), magnetic RAM, core memory, magnetic disk storage mediums, optical storage mediums, flash memory devices and/or other machine readable mediums for storing information. The term "machine-readable medium" includes, but is not limited to portable or fixed storage devices, optical storage devices, and/or various other storage mediums capable of storing that contain or carry instruction(s) and/or data.

While the principles of the disclosure have been described above in connection with specific apparatuses and methods, it is to be clearly understood that this description is made only by way of example and not as limitation on the scope of the disclosure.

What is claimed is:

1. A method of selecting interactive content resources for execution by a content executor, the method comprising:
   receiving, by a content resource execution analyzer, data from a plurality of execution client devices, wherein each of the execution client devices is associated with a content executor, and wherein the data received from each particular execution client device includes data identifying one or more occurrences of an execution of an interactive content resource on the particular execution client device initiated by the associated content executor;
   storing, by the content resource execution analyzer, the data received from the each of the plurality of execution client devices, into a matrix data structure storing associations between content executors and interactive content resources;
   determining, by the content resource execution analyzer, one or more correlations between a first content executor and one or more other content executors, based on an analysis of the matrix data structure storing associations between content executors and interactive content resources;
   aggregating, by the content resource execution analyzer, data from the matrix data structure corresponding to the executions of interactive content resources initiated by the other content executors correlated to the first content executor;
   comparing, by the content resource execution analyzer, the aggregated data corresponding to the executions of interactive content resources initiated by the other content executors, to data from the matrix data structure corresponding to the executions of interactive content resources initiated by the first content executor;
   selecting, by the content resource execution analyzer, one or more particular interactive content resources for execution by the first content executor, based on the comparison, wherein the selection of the particular interactive content resources for execution by the first content executor comprises:
      determining a required minimum credential level associated with each of the particular interactive content resources;
      comparing the required minimum credential level for each of the particular interactive content resources, to credential data associated with first content executor; and
      selecting each of the particular interactive content resources for execution by the first content executor, based on a determination that the first content executor includes sufficient credential data to execute each of the particular interactive content resources;
   in response to an authenticated login request of the first content executor, establishing a first networking session during which the first content executor is permitted to execute one or more interactive content resources; and
   during the first networking session, providing access to the particular interactive content resources selected for execution by the first content executor.

2. The method of selecting interactive content resources for execution by a content executor of claim 1, wherein determining correlations between the first content executor and the one or more other content executors comprises:
   receiving a credential level associated with first content executor;
   receiving one or more additional credential levels associated with the one or more other content executors; and
   excluding from the determination any of the other content executors having credential levels greater than the first content executor.

3. The method of selecting interactive content resources for execution by a content executor of claim 1, wherein the selection of the particular interactive content resources for execution by the first content executor comprises:
   determining one or more geographic jurisdictions associated with the first content executor;
   determining whether each of the particular interactive content resources is authorized in the one or more geographic jurisdictions associated with the first content executor; and
   selecting each of the particular interactive content resources for execution by the first content executor, based on a determination that each of the particular interactive content resources is authorized in the one or more geographic jurisdictions associated with the first content executor.

4. The method of selecting interactive content resources for execution by a content executor of claim 1, wherein determining correlations between the first content executor and the one or more other content executors comprises:
   applying singular vector decomposition to the matrix data structure storing;
   associations between content executors and interactive content resources; extracting key features from the matrix data structure based on the singular vector decomposition; and
   calculating similarity index values for each of the plurality of other content executors with respect to the first content executor.

5. The method of selecting interactive content resources for execution by a content executor of claim 4, wherein determining correlations between the first content executor and the one or more other content executors further comprises selecting a predetermined number of the other content executors having the highest similarity index values with respect to the first content executor.

6. The method of selecting interactive content resources for execution by a content executor of claim 4, wherein determining correlations between the first content executor and the one or more other content executors further comprises selecting any of the other content executors having a similarity index value greater than a predetermined similarity threshold.

7. The method of selecting interactive content resources for execution by a content executor of claim 1, wherein the data received from the plurality of execution client devices comprises, for each of the occurrences of an execution of an interactive content resource initiated by the associated content executor, feedback data corresponding to a performance level of an end user during the execution of an interactive content resource, and wherein the determined correlations between the first content executor and the one or more other content executors are further based on an analysis of the feedback data corresponding to the performance levels of end users during the executions of interactive content resources initiated by the first content executor and by the other content executors.

8. A system for selecting interactive content resources for execution by a content executor, the system comprising:

a processing unit comprising one or more processors; and memory coupled with and readable by the processing unit and storing therein a set of instructions which, when executed by the processing unit, causes the system to:

receive data from a plurality of execution client devices, wherein each of the execution client devices is associated with a content executor, and wherein the data received from each particular execution client device includes data identifying one or more occurrences of an execution of an interactive content resource on the particular execution client device initiated by the associated content executor;

store the data received from the each of the plurality of execution client devices, into a matrix data structure storing associations between content executors and interactive content resources;

determine one or more correlations between a first content executor and one or more other content executors, based on an analysis of the matrix data structure storing associations between content executors and interactive content resources;

aggregate data from the matrix data structure corresponding to the executions of interactive content resources initiated by the other content executors correlated to the first content executor;

compare the aggregated data corresponding to the executions of interactive content resources initiated by the other content executors, to data from the matrix data structure corresponding to the executions of interactive content resources initiated by the first content executor;

select one or more particular interactive content resources for execution by the first content executor, based on the comparison, wherein the selection of the particular interactive content resources for execution by the first content executor comprises:

determining a required minimum credential level associated with each of the particular interactive content resources;

comparing the required minimum credential level for each of the particular interactive content resources, to credential data associated with first content executor; and selecting each of the particular interactive content resources for execution by the first content executor, based on a determination that the first content executor includes sufficient credential data to execute each of the particular interactive content resources;

establish a first networking session during which the first content executor is permitted to execute one or more interactive content resources, in response to an authenticated login request of the first content executor; and during the first networking session, provide access to the particular interactive content resources selected for execution by the first content executor.

9. The system of claim 8, wherein determining correlations between the first content executor and the one or more other content executors comprises:

receiving a credential level associated with first content executor;

receiving one or more additional credential levels associated with the one or more other content executors; and excluding from the determination any of the other content executors having credential levels greater than the first content executor.

10. The system of claim 8, wherein the selection of the particular interactive content resources for execution by the first content executor comprises:

determining one or more geographic jurisdictions associated with the first content executor;

determining whether each of the particular interactive content resources is authorized in the one or more geographic jurisdictions associated with the first content executor; and selecting each of the particular interactive content resources for execution by the first content executor, based on a determination that each of the particular interactive content resources is authorized in the one or more geographic jurisdictions associated with the first content executor.

11. The system of claim 8, wherein determining correlations between the first content executor and the one or more other content executors comprises:

applying singular vector decomposition to the matrix data structure storing associations between content executors and interactive content resources;

extracting key features from the matrix data structure based on the singular vector decomposition; and calculating similarity index values for each of the plurality of other content executors with respect to the first content executor.

12. The system of claim 11, wherein determining correlations between the first content executor and the one or more other content executors further comprises selecting a predetermined number of the other content executors having the highest similarity index values with respect to the first content executor.

13. The system of claim 11, wherein determining correlations between the first content executor and the one or more other content executors further comprises selecting any of the other content executors having a similarity index value greater than a predetermined similarity threshold.

14. The system of claim 8, wherein the data received from the plurality of execution client devices comprises, for each of the occurrences of an execution of an interactive content resource initiated by the associated content executor, feedback data corresponding to a performance level of an end user during the execution of an interactive content resource, and wherein the determined correlations between the first content executor and the one or more other content executors are further based on an analysis of the feedback data corresponding to the performance levels of end users during the executions of interactive content resources initiated by the first content executor and by the other content executors.

15. A computer-program product tangibly embodied in a non-transitory machine-readable storage medium, including instructions configured to cause one or more data processors to perform actions including comprising:

receiving data from a plurality of execution client devices, wherein each of the execution client devices is associated with a content executor, and wherein the data received from each particular execution client device includes data identifying one or more occurrences of an execution of an interactive content resource on the particular execution client device initiated by the associated content executor;

storing the data received from the each of the plurality of execution client devices, into a matrix data structure storing associations between content executors and interactive content resources;

determining one or more correlations between a first content executor and one or more other content executors, based on an analysis of the matrix data structure storing associations between content executors and interactive content resources;

aggregating data from the matrix data structure corresponding to the executions of interactive content resources initiated by the other content executors correlated to the first content executor;

comparing the aggregated data corresponding to the executions of interactive content resources initiated by the other content executors, to data from the matrix data structure corresponding to the executions of interactive content resources initiated by the first content executor;

selecting one or more particular interactive content resources for execution by the first content executor, based on the comparison wherein the selection of the particular interactive content resources for execution by the first content executor comprises:

determining a required minimum credential level associated with each of the particular interactive content resources;

comparing the required minimum credential level for each of the particular interactive content resources, to credential data associated with first content executor; and selecting each of the particular interactive content resources for execution by the first content executor, based on a determination that the first content executor includes sufficient credential data to execute each of the particular interactive content resources;

establishing a first networking session during which the first content executor is permitted to execute one or more interactive content resources, in response to an authenticated login request of the first content executor; and during the first networking session, providing access to the particular interactive content resources selected for execution by the first content executor.

16. The computer-program product of claim 15, wherein determining correlations between the first content executor and the one or more other content executors comprises:

receiving a credential level associated with first content executor;

receiving one or more additional credential levels associated with the one or more other content executors; and excluding from the determination any of the other content executors having credential levels greater than the first content executor.

17. The computer-program product of claim 15, wherein the selection of the particular interactive content resources for execution by the first content executor comprises:

determining one or more geographic jurisdictions associated with the first content executor;

determining whether each of the particular interactive content resources is authorized in the one or more geographic jurisdictions associated with the first content executor; and selecting each of the particular interactive content resources for execution by the first content executor, based on a determination that each of the particular interactive content resources is authorized in the one or more geographic jurisdictions associated with the first content executor.

* * * * *